(12) United States Patent
Frei et al.

(10) Patent No.: US 12,342,167 B2
(45) Date of Patent: *Jun. 24, 2025

(54) METHODS AND APPARATUS FOR PERFORMING ACCESS AND/OR FORWARDING CONTROL IN WIRELESS NETWORKS SUCH AS WLANS

(71) Applicant: Juniper Networks, Inc., Sunnyvale, CA (US)

(72) Inventors: Randall Frei, San Jose, CA (US); Sujai Hajela, Saratoga, CA (US); Guy Goldstone, Palm Harbor, FL (US); Nicolas Dade, Santa Cruz, CA (US); Linker Cheng, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 17/303,387

(22) Filed: May 27, 2021

(65) Prior Publication Data

US 2021/0297858 A1   Sep. 23, 2021

Related U.S. Application Data

(63) Continuation of application No. 15/679,128, filed on Aug. 16, 2017, now Pat. No. 11,051,169.

(51) Int. Cl.
*H04L 29/06* (2006.01)
*H04L 9/08* (2006.01)
(Continued)

(52) U.S. Cl.
CPC ......... *H04W 12/08* (2013.01); *H04L 9/0897* (2013.01); *H04L 9/3226* (2013.01);
(Continued)

(58) Field of Classification Search
CPC ..... H04W 12/08; H04W 12/04; H04W 84/12; H04L 9/0897; H04L 63/0471; H04L 2209/80

See application file for complete search history.

(56) References Cited

U.S. PATENT DOCUMENTS 6,526,506 B1 * 2/2003 Lewis ................... H04L 9/0891
380/278
7,706,777 B2    4/2010 Karaoguz et al.
(Continued)

FOREIGN PATENT DOCUMENTS

CN    101123811 A    2/2008
CN    103391540 B    1/2017
(Continued)

OTHER PUBLICATIONS

"Australian Application Serial No. 2018316617, First Examination Report mailed Dec. 21, 2020", 4 pgs.
(Continued)

*Primary Examiner* — Evans Desrosiers
(74) *Attorney, Agent, or Firm* — Shumaker & Sieffert, P.A.

(57) ABSTRACT

Methods and apparatus for controlling access to and/or forwarding of communicated information, e.g. traffic, in a wireless communication system are described. The key, e.g., PSK, used to secure data that is transmitted to an access point for communication to a destination device is taken into consideration when deciding whether or not to provide the destination device access to the communicated content. The decision of whether or not to provide the destination device access to a communication may involve deciding whether or not to forward the received data to another device, e.g., another access point, for delivery to the destination device and/or may involve deciding whether or not to transmit the data to the destination device. If the destination device is not
(Continued)

associated with, e.g., does not have access to and/or authorization to use, the key used to secure the received data, the data is not communicated to the destination device.

20 Claims, 14 Drawing Sheets

(51) Int. Cl.
  *H04L 9/32* (2006.01)
  *H04L 9/40* (2022.01)
  *H04W 12/04* (2021.01)
  *H04W 12/08* (2021.01)
  *H04W 84/12* (2009.01)

(52) U.S. Cl.
  CPC ......... *H04L 63/0471* (2013.01); *H04W 12/04* (2013.01); *H04L 2209/80* (2013.01); *H04W 84/12* (2013.01)

(56) References Cited

U.S. PATENT DOCUMENTS

| | | | |
|---|---|---|---|
| 11,051,169 | B2 | 6/2021 | Frei et al. |
| 2002/0116606 | A1 | 8/2002 | Gehring |
| 2006/0251256 | A1 | 11/2006 | Asokan et al. |
| 2007/0197238 | A1* | 8/2007 | Nakajima ............ H04W 12/08 455/411 |
| 2008/0044024 | A1 | 2/2008 | Oh et al. |
| 2008/0298375 | A1* | 12/2008 | Agardh ................ H04L 63/065 455/84 |
| 2010/0115278 | A1 | 5/2010 | Shen et al. |
| 2011/0283156 | A1 | 11/2011 | Hiie |
| 2013/0103939 | A1* | 4/2013 | Radpour ............. H04W 12/50 713/152 |
| 2017/0134956 | A1 | 5/2017 | Radpour |

FOREIGN PATENT DOCUMENTS

| | | |
|---|---|---|
| CN | 111213398 A | 5/2020 |
| WO | 2017190616 A1 | 11/2017 |
| WO | 2019035908 A1 | 2/2019 |

OTHER PUBLICATIONS

PCT Notification of Transmittal of The International Search Report and The Written Opinion of the International Searching Authority, or the Declaration with the International Search Report and Written Opinion of the International Searching Authority, for International Application No. PCT/US2018/000176, pp. 1-8. Mailed Dec. 27, 2019.

Office Action from counterpart Canadian Application No. 3,073,110 dated Mar. 29, 2021, 5 pp.

Extended Search Report from counterpart European Application No. 18846412.7, dated Mar. 30, 2021, 6 pp.

Prosecution History from U.S. Appl. No. 15/679,128, dated Jun. 21, 2019 through Mar. 4, 2021, 43 pp.

International Preliminary Report on Patentability from International Application No. PCT/US2018/000176, mailed Feb. 27, 2020, 7 pp.

Notice of Intent to Grant and Text Intended to Grant from counterpart European Application No. 18846412.7 dated Oct. 5, 2022, 113 pp.

First Office Action and Search Report from counterpart Chinese Application No. 201880067049.5 dated Jan. 13, 2023, 9 pp.

Response to Extended Search Report dated Mar. 30, 2021, from counterpart European Application No. 18846412.7, filed Oct. 15, 2021, 28 pp.

Extended Search Report from counterpart European Application No. 23161557.6 dated Jun. 13, 2023, 7 pp.

Response to Extended Search Report dated Jun. 13, 2023, from counterpart European Application No. 23161557.6 filed Feb. 1, 2024, 10 pp.

Communication pursuant to Article 94(3) EPC from counterpart European Application No. 23161557.6 dated Apr. 4, 2025, 4 pp.

* cited by examiner

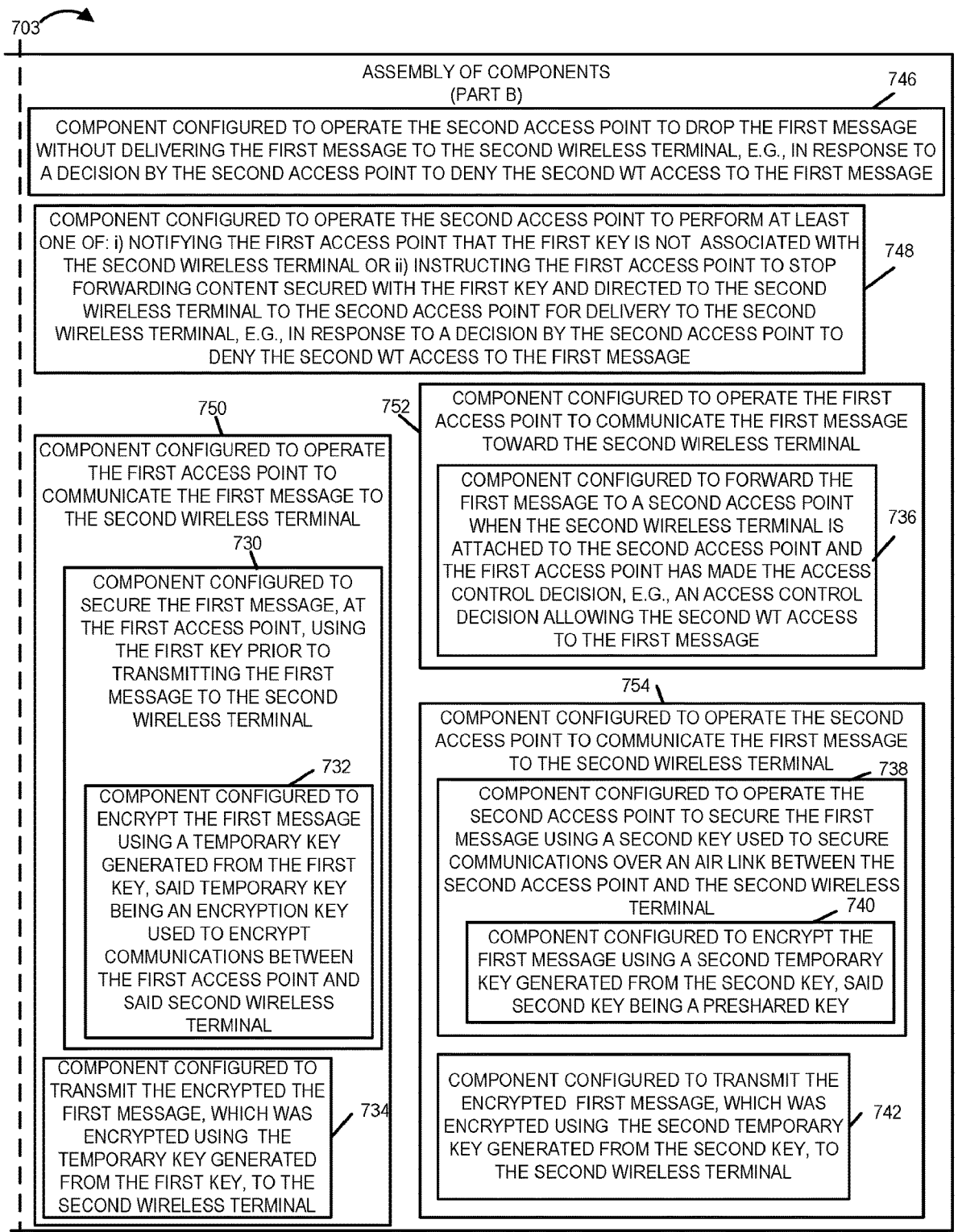

METHODS AND APPARATUS FOR PERFORMING ACCESS AND/OR FORWARDING CONTROL IN WIRELESS NETWORKS SUCH AS WLANS

This application is a continuation of U.S. application Ser. No. 15/679,128, filed Aug. 16, 2017, the entire content of which is herein incorporated by reference.

TECHNICAL FIELD

The present application relates to wireless networks and, more particularly to methods and/or apparatus which can be used to control and/or limit access to communicated information, e.g., traffic, communicated using a WLAN (Wireless Local Area Network) or another network.

BACKGROUND

Wireless local area networks (WLANS) and various other types of networks are commonly being used to communication information, e.g., data, between wireless devices such as cell phones and thus between users who use different cell phones. One common approach to providing security through the use of encryption involves the use of what is referred to as a PSK which stands for Pre-Shared Key.

In many systems to avoid unauthorized use of a network and to provide security for information transmitted over the air, the information transmitted wirelessly over the air is often encrypted, e.g., secured, using a security key also sometimes referred to as an encryption key. WiFi systems often rely on the use of preshared keys (PSKs) for security to enable such encryption. In such systems the PSK is often used in combination with other information or values to generate a short term encryption key that is used to encrypt and/or decrypt communications for a particular communications session and/or limited time period. While in such systems the PSK may not be used to directly encrypt or decrypt a particular communication, the PSK enables and is used in the securing, e.g., encryption, of the communication since it is used in the generation of the transient encryption key used to perform the actual encryption/decryption of the transmitted or received communication.

Wi-Fi Protected Access (WPA) is a commonly used security protocol developed by the Wi-Fi Alliance to secure wireless computer networks that relies on the use of PSKs.

WPA-Personal, also sometimes identified as WPA-PSK (preshared key) mode, is a common security approach designed for home and small office networks in which each wireless network device encrypts the network traffic using a 256 bit key. This key may be entered either as a string of 64 hexadecimal digits, or as a passphrase of 8 to 63 ASCII characters.

A WLAN protected with WPA security normally uses a single PSK (Pre-shared key) for all stations on the WLAN. Some vendors allow multiple PSKs ("private PSK" or "per-user PSK") on a single WLAN. In either the normal implementation where a single PSK is used by all devices or where in an implementation where different users use different PSKs, when data arrives from a wireless station the station's MAC address is used to look up the appropriate key which is then used to decrypt the traffic. The equivalent key lookup is then used to re-encode the received traffic prior to transmission to a destination device. Thus, once received the data is decoded and then re-encoded prior to transmission.

While a PSK is used to secure the traffic sent over the air link, once decoded, assuming successful decoding of the content by the receiving access point, in convention systems the original PSK does not affect or influence routing or retransmission decisions with the successfully decoded data being routed and transmitted based on a destination address or other destination indicator included in the decoded traffic.

As devices become multi-mode devices, it is becoming more common for data transmitted on one network to be communicated to another network for delivery to a destination device. Different networks may use different encryption techniques and, in current systems, may not have knowledge of how the traffic being sent over a communications network was originally encrypted, e.g., for transmission to an access point which receives the traffic from the original wireless terminal sending the traffic.

One approach to data security is to keep data in encrypted form as it is transmitted from a source device to a destination device thereby providing security by requiring that the receiving device be capable of decrypting the transmitted data in its original form. Such end to end encryption is often in addition to, and independent of, the encryption used over an airlink between a wireless terminal and an access point. When such end to end encryption is used, the network or networks over which the traffic is transmitted generally act as mere delivery devices with the end device being responsible for making sure that the traffic it receives is in fact traffic which the device is able to decrypt and use. In such an end to end encryption approach devices which receive data that they are not entitled to receive will be unable to decrypt the data since they will lack the security key required to perform such encryption; however, the network resources will have been wasted in delivering such content which was addressed to the destination device.

While transmitting traffic without decrypting it at an access point may improve end to end security in some cases, it tends to increase overhead and may result in the communication and/or forwarding of traffic to devices which will not be able to decrypt the content and which should not have received the traffic in the first place.

From the above discussion, it should be appreciated that the communication of traffic in an encrypted form, which is not decodable by the network devices used to communicate the traffic, in at least some but not necessarily all cases can be wasteful and result in the transmission and communication of data which will not ultimately be used and which probably should never have been delivered in the first place but maybe because of an addressing error or for some other reason were delivered.

It would be desirable if improved methods and/or apparatus could be developed which could be used to restrict access to content and/or forwarding of content based on a device's access to encryption keys without requiring, in some but not necessarily all cases, end to end encryption of the content as it is transmitted through a communications network or networks.

SUMMARY

Methods and apparatus for controlling access to and/or forwarding of communicated information, e.g. traffic, in a wireless communication system are described. In various embodiments, which key, e.g., PSK, is used to enable encryption and/or decryption of data that is transmitted to an access point for communication to a destination device is taken into consideration when deciding whether or not to provide the destination device with content. The decision of whether or not to provide the destination device with the content is an access control decision and may involve deciding whether or not to forward the received data to another device, e.g., another access point, for delivery to the destination device and/or may involve deciding whether or not to transmit the data to the destination device when the destination device is attached to the same access point as the transmitting device. In various embodiments if the destination device is not associated with, e.g., does not have access to and/or authorization to use, the preshared key (PSK) which was used to enable the encryption and/or decrypting of the received data, the data is not communicated to the destination device.

It should be noted that while the key, e.g., PSK, used to enable encryption of data for communication over the airlink between the sending device and an access point is taken into consideration during the access control operation, the access control operation is decoupled in many cases from the PSK used to generate the encryption key that is used to transmit the data, assuming it is delivered to the destination device, from an access point to which the destination device is coupled. In other words, the PSK, e.g., a first encryption key, or security procedure using an encryption key used to secure a first airlink between the sending device, e.g., a first wireless terminal, and a first access point to which the sending device is coupled may be, and often will be, different from the encryption key, e.g., a second PSK, used to secure communications between the destination device, e.g. a second wireless terminal, and an access point, e.g., a second access point, to which the second wireless terminal is coupled. The PSK as discussed above used to secure a particular communication may be, and often is, used in the generation of a temporary or transient encryption key which is then used to perform the actual encryption or decryption of a wireless communication transmitted over the air.

In various embodiments, data, e.g., traffic such as a message or other information to be communicated is received in encrypted form and then decrypted, e.g., using a first encryption key, e.g., a first PSK that is used to generate the transient encryption key used for decryption or encryption. The intended destination device is identified by a destination address or other destination identifier that may be, and normally is, communicated with the traffic data. A check is made as to whether the key, e.g., PSK, that was used by the sending device to enable decrypt of the content and/or encryption of the content to be communicated to the destination device is associated with the destination device. This check may be, and sometimes is, made by the device acting as the access control device but the check may be made at a variety of locations in a system depending on the particular embodiment.

The access point which receives the traffic to be communicated may, and often will, act as the access control device. This is particularly common where the destination device is attached to the same access point as the source device and has knowledge of one or more keys, e.g., PSKs, associated with the destination device, e.g., because it knows what PSK key is being used to secure communications between the access point and destination device or has access to a key association record maintained or distributed by another device such as a management node in the network. If an access point which receives traffic to be communicated is acting as the access control device and determines that the destination device is not associated with the key, e.g., PSK, that was used to enable decryption and/or encryption of the traffic sent to the access point for communication to the destination device, the access point will drop the data without forwarding it to a the destination device or another device in the network through which the content may be delivered to the destination device. Such an approach avoids sending traffic through the network or over the downlink of the first access point when the destination device is not associated with the encryption key, e.g., PSK, used to enable decryption of the traffic transmitted to the first access point.

In some cases, such as those in which the destination device is not directly attached to the first access point which received the data to be communicated, the first access point may not have information about which keys, e.g., PSKs, are associated with the destination device. In such an embodiment the first access point forwards the decrypted traffic towards the destination device with information indicating the encryption key, e.g., PSK, that was used to enable decryption of the original encrypted traffic. Prior to the traffic being communicated to the destination device another network device, e.g., the second access point to which the destination device is attached, acts as an access control device and checks to make sure the encryption key, e.g., PSK, which was used to enable decrypt the originally transmitted content is associated with the destination device.

Consider for example an embodiment where the second access point access to which the destination device is attached acts as the access control device. In such an embodiment the second access point has knowledge of what encryption key, e.g., PSK, it is using to secure communications with the destination device and also can request information from the destination device as to what other encryption keys, e.g., PSKs, are associated with the device if it does not have access to a key association record for the destination device provided by a management node or other device in the network.

If the device acting as the access control device, e.g., the access point to which the destination device, e.g., destination wireless termination, is attached, determines that the destination device is associated with the key, eg., PSK, that was used to enable decryption of the traffic that was transmitted by the source wireless terminal to the first access point, the data is secured encrypted with whatever key, e.g., PSK, is used to secure the airlink between the destination device and the access point to which it is attached and transmitted to the destination device. The securing of data using the PSK may and sometimes does involve using a transient key generated from the PSK used to secure the data to encrypt the data to be transmitted. The data may be, and sometimes, is secured with a key, e.g., a second PKS, which is different from the first key, e.g., PSK, that was used to originally used to secure, e.g., enable encryption and decryption of the data being communicated. Thus, while the destination device may be required to be associated with the key, e.g., PSK, that was used to secure the original communication, an entirely different key, e.g., second PSK, may be used to secure the data over the airlink to the destination device. Thus, the access point to which the destination device is coupled need not use the same PSK and can even use a different encryption scheme than the encryption scheme used by the original source device for over the air transmissions.

In view of the above, it should be appreciated the methods and apparatus, in accordance with the present invention, are well suited for providing access control between not only devices on the same wireless network but also for traffic sent between networks which use different encryption and/or security over the air link and potentially even different protocols over the airlink. For example, the methods and apparatus described herein can be used to provide access control between a source device operating on a WiFi network and a destination device operating on a different network, e.g., an LTE network or visa versa.

Numerous variations on the above described methods and apparatus are possible and remain within the scope of the present invention. While various embodiments have been discussed in the summary above, it should be appreciated that not necessarily all embodiments include the same features and some of the features described above are not necessary for all embodiments. Numerous additional features, embodiments and benefits of various embodiments are discussed in the detailed description which follows.

BRIEF DESCRIPTION OF THE FIGURES

FIG. 5 comprises the combination of FIGS. 5A, 5B, 5C, 5D, and 5E.

FIG. 7B is a second part of an exemplary assembly of components which may be included in an exemplary access point in accordance with an exemplary embodiment.

FIG. 7 comprises the combination of FIG. 7A and FIG. 7B.

DETAILED DESCRIPTION

Figure 1:
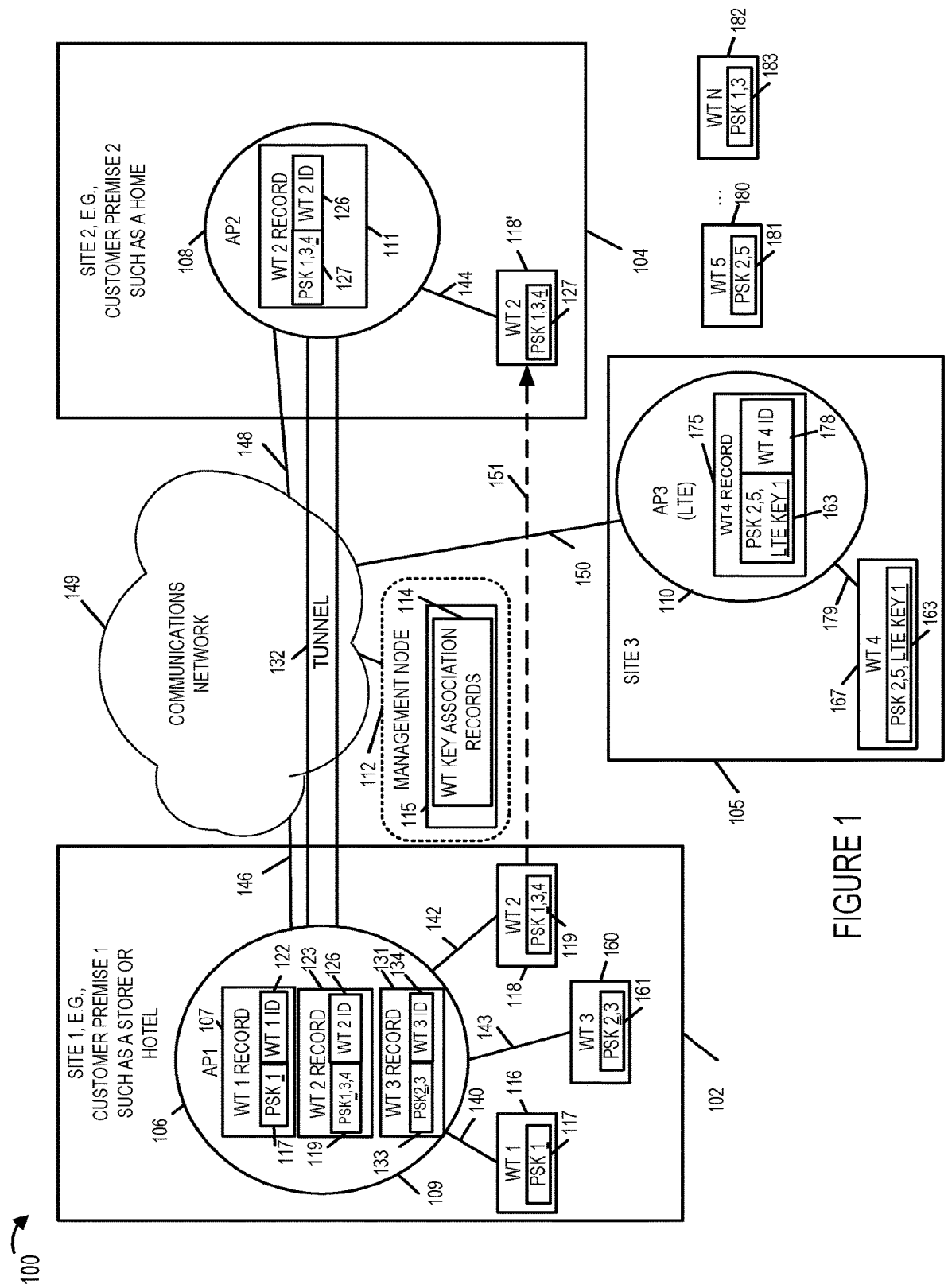
FIG. 1 is a drawing of an exemplary system, in accordance with an exemplary embodiment.

FIG. 1 is a drawing of an exemplary system 100 implemented in accordance with an exemplary embodiment. The exemplary system 100 includes a plurality of customer premises located at different sites, e.g., a first customer premise 102, e.g., a store or hotel, a second customer premise 104, e.g., a home or office. A first access point AP1 106, which may be, e.g., a WiFi access point, is located at the first site 1 102 while a second access point AP2 108, which may be a second WiFi access point, is located at the second site 104. While WiFi access points are used in the exemplary system shown in FIG. 1 for the first and second access points 106, 108, the access points may be any of a wide range of different types of access points and may, in some embodiments, support multiple different communications protocols and/or standards. For example Bluetooth access points may be used in place of WiFi access points 106, 108 or APs which can support both Bluetooth and WiFi may be used.

The system 100 also includes a third site 105 where a macro or femto base station, e.g., an LTE base station 110. The base station 110 serves as a third access point (AP3) which uses licensed spectrum and the LTE communications protocol.

Thus in the exemplary system 100 first through third sites each include at least one access point, respectively, which are coupled together, e.g., via the communications links 146, 148, 150 which connect the access points to the communications network 149. The communications network 149 may be a service provider network, the Internet or some other network used to connect wireless access points 106, 108 and 110 located at the first through third sites 102, 104, 105 respectively. A secure tunnel 132 is established in some embodiments between one or more access points, e.g., the first access point 106 and the second access point 108, but the use of one or more secure tunnels is optional.

In addition to the access points 106, 108, 110 the communications system 100 includes a management node 112 that is optional and used in some but not all embodiments. Management node 112 includes a storage device 115 for storing wireless terminal key association information 114. In at least some embodiments where the management node 112 is present, the management node 112 is responsible for storing wireless terminal key associations records 114 and for making the key association information available to the access points 106, 108, 110 on an as needed basis by supplying copies of the key association records 114 to the access points 106, 108, 110. The key association records store information indicating which key or keys, e.g., PSKs, a wireless terminal is allowed to or does use/have access to. A record in the key association table 114 identifies a wireless terminal to which the record corresponds and which keys, e.g., PSKs, master, or long term keys, are associated with the wireless terminal. The keys in the key association table 114 maybe and sometimes are valid for more than the duration of a communications session and may be valid for days, weeks or even longer. The keys indicated in key association table 114 may be and sometimes are PSKs used to secure wireless communications and maybe used to generate one or more transient keys used to encrypt and/or decrypt communications sent over an airlink. In some embodiments the record includes a wireless terminal identifier and a list of keys/encryption information associated with the wireless terminal, e.g., PSKs or other long term keys known to the wireless terminal and available for use by the wireless terminal. One record is maintained for each wireless terminal in the system. The management node 112 may receive key information, e.g., PSK or other long term key information, corresponding to an individual wireless terminal from the wireless terminal which may report keys it uses, or has access to, to the management node 112 or from one or more access points which may report to the management node 112 which key or keys, e.g., PSKs, the access point is using to secure communications with a particular wireless terminal at a given time. The management node 112 updates a record corresponding to an individual wireless terminal based on the information it receives. Thus over time as multiple different access points report to the management node what key, e.g., PSK, is being used to secure communications with a particular wireless terminal, the record corresponding to that wireless terminal may be, and normally will be, updated to reflect that the wireless terminal has access to the multiple keys which it was using at the different access points. The key association records for individual wireless terminals stored by the management node 112 may be the same or similar to the WT key records stored in an AP.

Each access point 106, 108, 110 communicates with one or more wireless terminals. In the FIG. 1 system, a first wireless terminal (WT 1) 116, a second wireless terminal (WT 2) 118 and a third wireless terminal (WT 3) 160 are shown attached to AP1 106 as represented by wireless communications links 140, 142, 143. AP1 106 stores a set of wireless terminal key records 107, 123, 131. Each record in the set of records can be, and in some embodiments is, an individual record including a WT ID and set of keys, e.g., long term keys such as WiFi or other PSKs, associated with the WT. For example record 107 includes the first identifier WT 1 ID 122 corresponding to WT 1116 and the list of keys 117 corresponding to the first wireless terminal WT 1. The set of keys 117 corresponding to WT 1 includes a single key PSK1 with the 1 being underlined to indicate that it is the key used to secure, e.g., enable encryption and/or decryption, of communications over air link 140 which is used to communicate traffic, e.g., data and/or messages, between WT1 116 and AP1 106. Wireless terminal 116, like the AP1 106 stores the encryption key PSK 1 117 in memory with the key being used to secure the communications with the access point, AP1 106 to which WT 1 116 is attached.

Wireless terminal 2 118 is attached to the AP 1 106 by wireless link 142. WT 2 118 includes three different PSK keys PSK1, 3 and 4 with 1 being underlined to show that it is being used to secure the communications with AP1 106 to which WT 2 118 is attached. The key record 123 corresponding to WT 2 118 that is stored in the first access point 106 reflects that keys PSK 1, 3 and 4 are associated in the key portion 119 of the record 123 with WT 2 as indicated by the WT 2 ID 126 being located as part of the record 123.

Wireless terminal 3 160 is attached to the AP 1 106 by wireless link 143. WT 3 160 includes two different PSK keys, PSK 2 and 3 with 2 being underlined to show that it is being used to secure the communications with AP1 106 to which WT 3 160 is attached. The key record 131 corresponding to WT 3 160 that is stored in the first access point 106 reflects that keys PSK 2 and 3 are associated in the key portion 133 of the record 131 with WT 3 as indicated by the WT 3 ID 134 being located as part of the record 131.

In FIG. 1 arrow 151 is used to represent movement for WT2 118 to site 2 104 where it is shown connected to AP 2 108 and identified with the reference number 118' to show that it is WT 2 118 at a different time than when it was at site 1 102. While WT 2 118' is at site 2, assume for purposes of the example that none of the other wireless terminals have moved or changed cells other than WT 2. While at site 2 104, rather than use PSK 1, the wireless terminal uses PSK 4 to secure communications with AP 2 108 to which it is attached by communications link 144. AP 2 108 includes a key record 111 corresponding to WT 2 that includes key information 127 which shows PSK keys 1, 3 and 4 are associated with WT 2 and that key PSK4 is being used to secure communications with WT 2 which is identified in the record 127 by WT 2 ID 126.

Traffic data sent by one of the wireless terminals WT 1 116 or WT 3 160 and addressed to WT 2 will be received and decrypted by AP 106. If the data is from WT 1116, PSK 1 will be used to enable decryption of the traffic but if it is from WT 3 160 PSK 2 will be used to enable decryption of the traffic. Based on the destination identifier sent with the traffic, e.g., a destination address corresponding to WT 2 106, AP 1 will determine based on the key record and information indicating which key was used to decrypt the received traffic addressed to WT 2 whether WT 2 118 is allowed to access the content, e.g., traffic and thus whether or not it should be communicated to WT 2. In some embodiments to be entitled to receive traffic that was communicated over an air link to the AP from a source WT, the destination device is required to be associated with, e.g., be entitled to use and/or have access to, the key, e.g., PSK, which was used by the receiving AP, e.g., AP1 106 to secure the received data.

In the case of a message sent from WT 1 116 or WT 3 160 that is directed, e.g., addressed, for delivery to WT 2 from WT 1 116 or WT 3 160, AP1 106 will check the key record 123 associated with WT 2 whether the key, e.g, PSK, used to secure, e.g., enable encryption, of the traffic addressed to WT 2 is associated with WT 2. Consider for example that WT 1116 will encrypt the traffic with a short term key generated from PSK 1 which maybe considered a "master" key. PSK 1 is in the key record 123 of WT 2. Thus, WT 2 is entitled to receive the content that is sent by WT 1 116 while it is attached to AP1 106 and using PSK 1 to secure the communication. If WT 2 is attached to AP 1 106 at the time the traffic from WT 1 116 is received, the key association check performed as part of an access control and/or forwarding function will be satisfied and the traffic will be re-encrypted using PSK 1 to secure the communication and the communication will then be transmitted from AP1 106 to WT 2 118 over air link 142. If however WT 2 is attached to AP2 108 at the time traffic addressed to WT 2 is received at AP 1 106, the decrypted data will be forwarded, e.g., via tunnel 132, to AP 2 108 for delivery. PSK4 is used to secure traffic at site 2 104 corresponding to AP2 108. In such a case AP2 108 will use PSK 4 to secure the communication and as part of securing the communication will re-encrypt the data using an encryption key generated based on PSK4, and transmit the encrypted data over air link 144 to WT 2 118'. Thus it should be appreciated that while the key, e.g., PSK, which is used to originally secure content to be delivered to a WT is taken into consideration for access control, e.g., forwarding and/or delivery purposes, the key, e.g., PSK, which was used to originally secure the traffic need not be the key used to secure the traffic for final delivery.

The access points may be part of the same or different networks and may use the same or different communications protocols. For example, in the FIG. 1 example, AP 1 106 is a WiFi access point which uses PSK 1 to secure communications with WT 1116 and WT 2 118 while PSK 2 is used to secure communications with WT 3 160.

In FIG. 1 AP 3 110 is an LTE base station. It uses LTE security protocols and an LTE encryption key to secure communications over the air link 179 to WT 4 167. WT 4 167 is a multi-mode device which includes in memory key record 163 and keys PSK 2 and 5 for communication with WiFi networks and LTE KEY 1 for communication over the LTE air link 179. AP 3 110 includes a key record 175 for WT 4 167 which indicates in the key information portion 163 of the record 175 that WT4 167 is associated with keys PSK 2, 5 and LTE Key 1 and that LTE Key 1 is being used to secure communications with AP 3 110 as indicated by the underlining.

While wireless terminals WT 1116 through WT 4 167 are shown attached to APs in the FIG. 1 example, the system includes additional WTs and/or APs. For example WT 5 180 and WT N 182 are shown in FIG. 1 along with the keys, e.g., PSKs or other long term keys, that each of these WTs stores and has access to. WT 5 180 has in its memory key record 181 and keys PSK 2 and PSK 5 and WT N 182 has in its memory key record 182 and keys PSK 1 and PSK 3. When present the management node 112 will store key association records for the various wireless terminals in the system and provide them to the APs 106, 108, 110 as needed, e.g., when a particular WT attached to an AP or by publishing them so that each AP has a complete or large set of WT key association records which it can use to make access control decisions.

Figure 2:
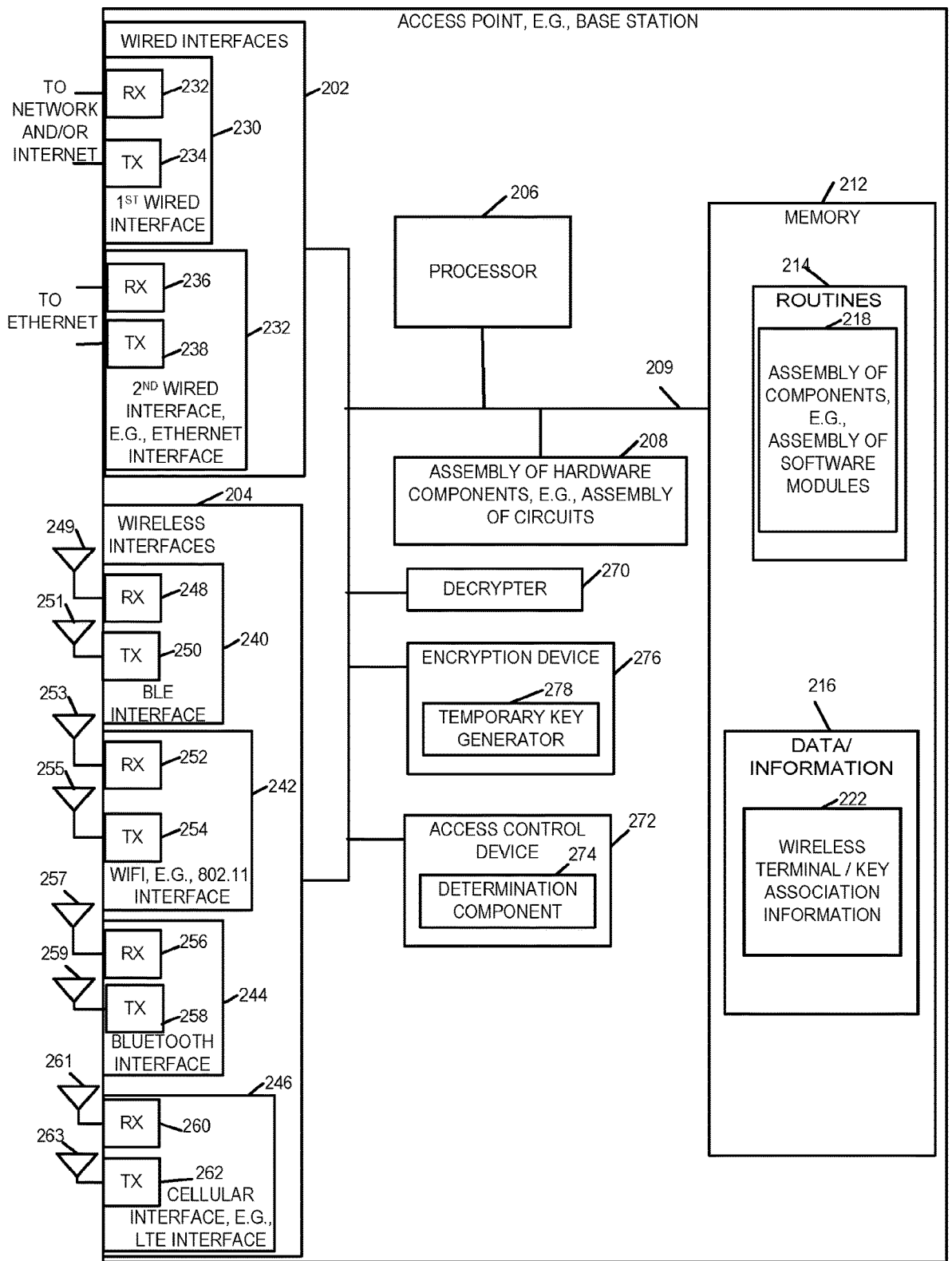
FIG. 2 illustrates exemplary access point which may be used in the system shown in FIG. 1.

FIG. 2 is a drawing of an exemplary access point 200, e.g., base station, in accordance with an exemplary embodiment. In some embodiments, access points (API 106, AP2 108, AP3 110) of FIG. 1 are the same as access point 200 of FIG. 2.

Access point 200 includes wired interfaces 202, wireless interfaces 204, a processor 206, e.g., a CPU, a memory 212, and an assembly of components 208, e.g., assembly of hardware components, e.g., assembly of circuits, a decrypter 270, an access control device 272, and an encryption device 276 coupled together via a bus 209 over which the various elements may interchange data and information. Access control device 272 includes a determination component 274. Encryption device 276 includes a temporary key generator 278. Wired interfaces 202 includes a 1st wired interface 230 including receiver 232 and transmitter 234 and a second wired interface 232 including receiver 236 and transmitter 238. 1st wired interface couples the access point 200 to a network and/or the Internet. 2nd wired interface 232, e.g., an Ethernet interface, couples the access point 200 to an Ethernet network. Wireless interfaces 204 includes a Bluetooth Low Energy (BLE) interface 240, a WiFi interface 242, e.g. 802.11 interface, a Bluetooth interface 244, and a cellular interface 246. BLE interface 240 includes receiver 248 coupled to receive antenna 249, via which the access point may receive wireless signals from communications devices, e.g., wireless terminals, and transmitter 250 coupled to transmit antenna 251 via which the access point may transmit wireless signals to communications devices, e.g., wireless terminals. WiFi interface 242 includes receiver 252 coupled to receive antenna 253, via which the access point may receive wireless signals from communications devices, e.g., wireless terminals, and transmitter 254 coupled to transmit antenna 255 via which the access point may transmit wireless signals to communications devices, e.g., wireless terminals. Bluetooth interface 244 includes receiver 256 coupled to receive antenna 257, via which the access point may receive wireless signals from communications devices, e.g., wireless terminals, and transmitter 258 coupled to transmit antenna 259 via which the access point may transmit wireless signals to communications devices, e.g., wireless terminals. Cellular interface 246 includes receiver 260 coupled to receive antenna 261, via which the access point may receive wireless signals from communications devices, e.g., wireless terminals, and transmitter 262 coupled to transmit antenna 263 via which the access point may transmit wireless signals to communications devices, e.g., wireless terminals. In some embodiments, the same antenna is used for one or more different wireless interfaces.

Memory 212 includes routines 214 and data/information 216. Routines 214 includes assembly of components 218, e.g., an assembly of software modules including at least a control routine which when executed by the processor 206 which is a hardware device controls the access point to operate in accordance with the methods described herein to perform one, more or all of the steps described as being performed by an access point. Data/information 216 includes wireless terminal/key association information 222 which includes in at least some embodiments at least a key association table such as the one shown in FIG. 3. The access point 200 may be used as any one of the access points of the system of FIG. 1. Receiver 252 is configured to receive data, e.g., messages in encrypted form from wireless terminals. Receiver 252 is configured to receive from a first wireless terminal in encrypted form, said first message being directed to a second wireless terminal, the first message being secured using a first key.

Decrypter 270 is configured to decrypt data received in encrypted form, e g., a message received in encrypted form, to recover the data, e.g., the message. Decrypter 270 is configured to decrypt at access point 200 the first message received in encrypted form to recover the first message.

Access control device 272 controls access to received data, e.g., messages, based on key association information. Access control device 272 is configured to control access to the first message based on the first key. The determination component 274 is configured to determine if the first key used to secure the first message is associated with a second wireless terminal. Determination component 274 is configured to determine if the first key used to secure the first message is associated with the second wireless terminal. Determination component 274 is configured to determine from stored information, e.g., WT key association records 212 stored in the access point 200, or WT key association records 115 stored in management node 112, if the second wireless terminal has access to the first key.

In some embodiments, the first key is a first preshared key (PSK).

Transmitter 254 or transmitter 262 is configured to communicate the first message to the second wireless terminal when it is determined that the first key used to secure the first message is associated with the second wireless terminal, and, e.g., the second wireless terminal is attached to access point 200.

Transmitter 234 or transmitter 238 is configured to transmit the first message toward the second wireless terminal when it is determined, e.g., by determination component 274, that the first key used to secure the first message is associated with the second wireless terminal, and, e.g., the second wireless terminal is attached to a different access point than access point 200, e.g., to a second access point which is different from the first access point.

Access control device 272 is configured to drop the first message without delivering the first message to the second wireless terminal in response to determining that the first key is not associated with the second wireless terminal.

Encryption device 276 is configured to secure the first message at access point 200, e.g., a first access point, using the first key prior to the second message being transmitted to the second wireless terminal. Temporary key generator 278 is configured to generate a temporary key from a encryption key used to secure communications, e.g., from a PSK. Temporary key generator 278 is configured to generate from the first key, a temporary key used by the encryption device 276 as an encryption key used to encrypt communication between access point 200, e.g., a first access point, and the second wireless terminal as part of securing the first message. Wireless terminal/key association information 222, lists for one or more WTs, one or more keys associated with each of the one or more wireless terminals. In some embodiments, WT/key association information 222 lists one or more keys associated with the first wireless terminal. In some embodiments, WT/key association information 222 lists one or more keys associated with the second wireless terminal.

Figure 3:
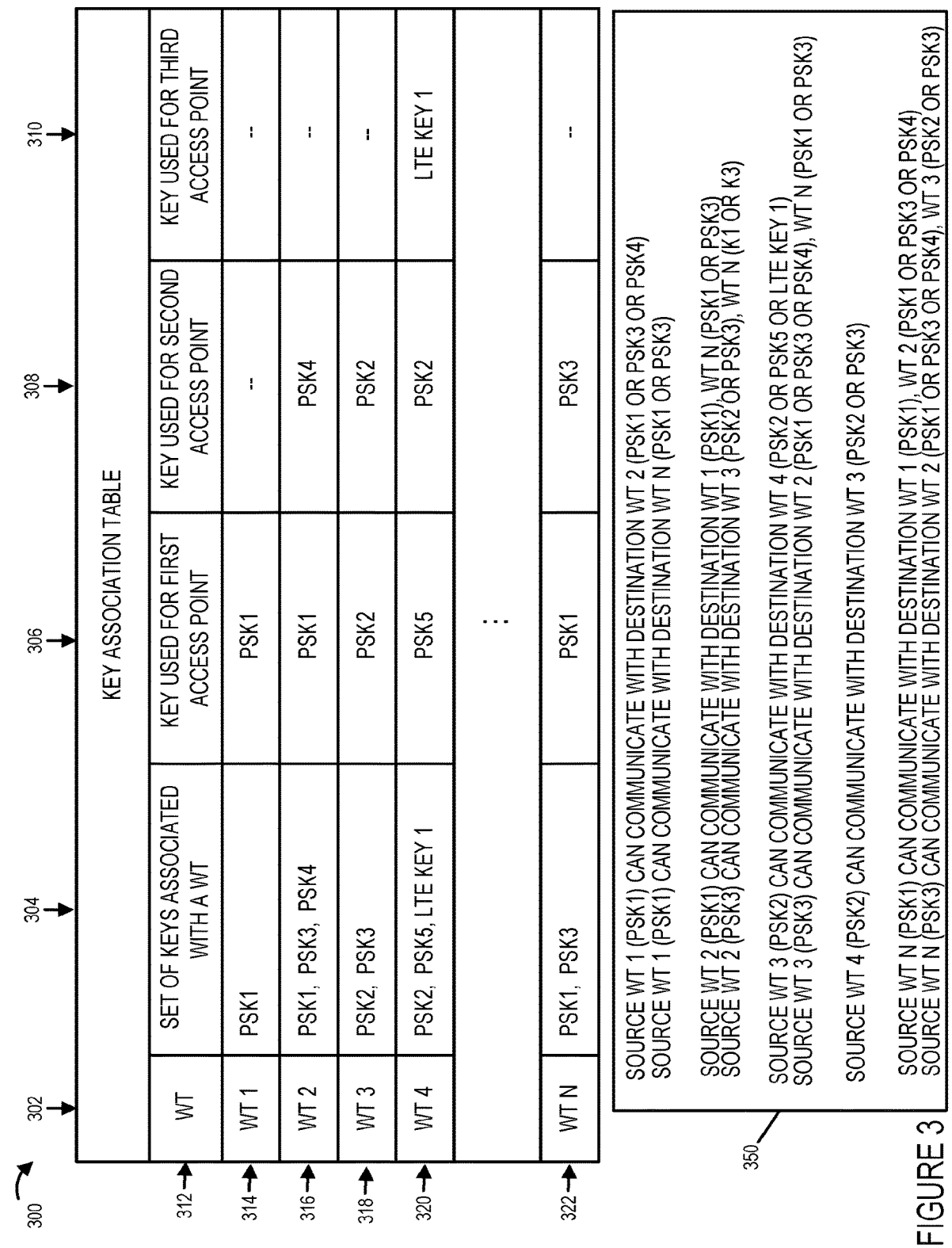
FIG. 3 illustrates an exemplary key association table that is used in some embodiments.

FIG. 3 shows an exemplary key association table 300 which may be, and in some embodiments is, used as the key association table stored in the APs of FIG. 1 and/or the WT key association records 114 of the management node 112 in embodiments where a management node 112 is used.

The key association table 300 includes a plurality of records with each line, e.g., row, of the table 300 being a record corresponding to a different wireless terminal. Row 312 lists the titles for each column of information in a record and indicates the information included in the column entry. For example, the first column 302 includes a WT identifier, the second column 304 includes a set of keys associated with the WT of the row identified in the first column 302. The third column 304 includes information indicating which key is used to secure communications between the WT and the first access point 106. Column four 308 indicates the key used to secure communications between the WT to which the record corresponds and the second access point 108 and column five 310 indicates the key used by the WT of the record to communicate with the third access point 110.

Each row 314, 316, 318, 320, 322 is a record corresponding to a different WT. For example row 314 is a record for WT 1 116 and indicates that key PSK 1 is associated with WT 1 116 and that when attached to the first access point 106 key PSK1 will be used to secure communications. The WT 1 116 does not have a key which can be used with access points two or three and thus dashes are indicated in columns 308 and 310.

Row 316 corresponds to WT 2 118 and includes the key association record 119 for WT 2 118. As can be seen in column 304, WT 2 118 is associated with keys PSK 1, PSK 3 and PSK4. From column 306 it can be seen that WT 2 118 will use key PSK1 to communicate with AP 1 106. From column 308 it can be seen that WT 2 118 will use PSK4 to communicate with the second access point 108 and from column 310 it can be seen that WT 2 118 does not have a key for communicating with the LTE access point AP 3 110.

Row 318 corresponds to WT 3 118 with which PSK2 and PSK 3 are associated in column 304. WT 3 160 will use key PSK2 for communicating with AP 1 106 and will use key PSK2 to communicate with AP2 108. WT 3 160 also lacks a key to communicate with AP3 110 as can be seen from the dash in column 310 corresponding to WT3 160.

Row 320 corresponds to WT 4 167, which has WiFi and LTE keys, and thus can communicate with LTE access point AP 3 110. From column 304 it can be seen that WT 4 167 is associated with PSK2, PSK 5 and LTE key 1. PSK 5 will be used by WT 4 167 to communicate with AP 1 106, PSK 2 will be used to communicate by WT 4 167 with AP 2 108, and LTE key 1 will be used to communicate with LTE access point AP 3 110.

Various rows corresponding to additional WTs are represented by the " . . . " sequence in FIG. 3.

Row 322 of table 300 corresponds to WT N 182 with which keys PSK 1 and PSK 3 are associated. WT N 182 will use PSK 1 to communicate with AP 1 106 and use PSK 3 to communicate with AP 2 108. From column 310 of row 322 it can be seen that WT N 182 does not have a key for communicating with LTE access point AP 3 110.

Box 350 is not part of key association table 300 but provides information on what device interactions are possible when various WTs shown in FIG. 1 are operating as a source of traffic, eg., a message or data, directed to another device using a communications link which is secured by use of a particular encryption key.

In accordance with various access control features, to be able to access content a destination device to which traffic is directed is required in some cases to be associated with, e.g., have access to or the right to use, the encryption key, e.g., PSK, or other information used to secure the traffic as it was sent over the air link from the source device. Thus, which devices a source of a message can send traffic to depends in at least some embodiments on whether or not the destination device is associated with the encryption key, e.g., PSK, used to originally secure the data sent by the source of the traffic over the air link to the first AP on the communications path towards the destination device. Which encryption key is being used at the destination device need not be a part of the access control decision but in some advanced systems, access control may and sometimes is made dependent on the particular key the destination device is using at a given time.

Figure 4:
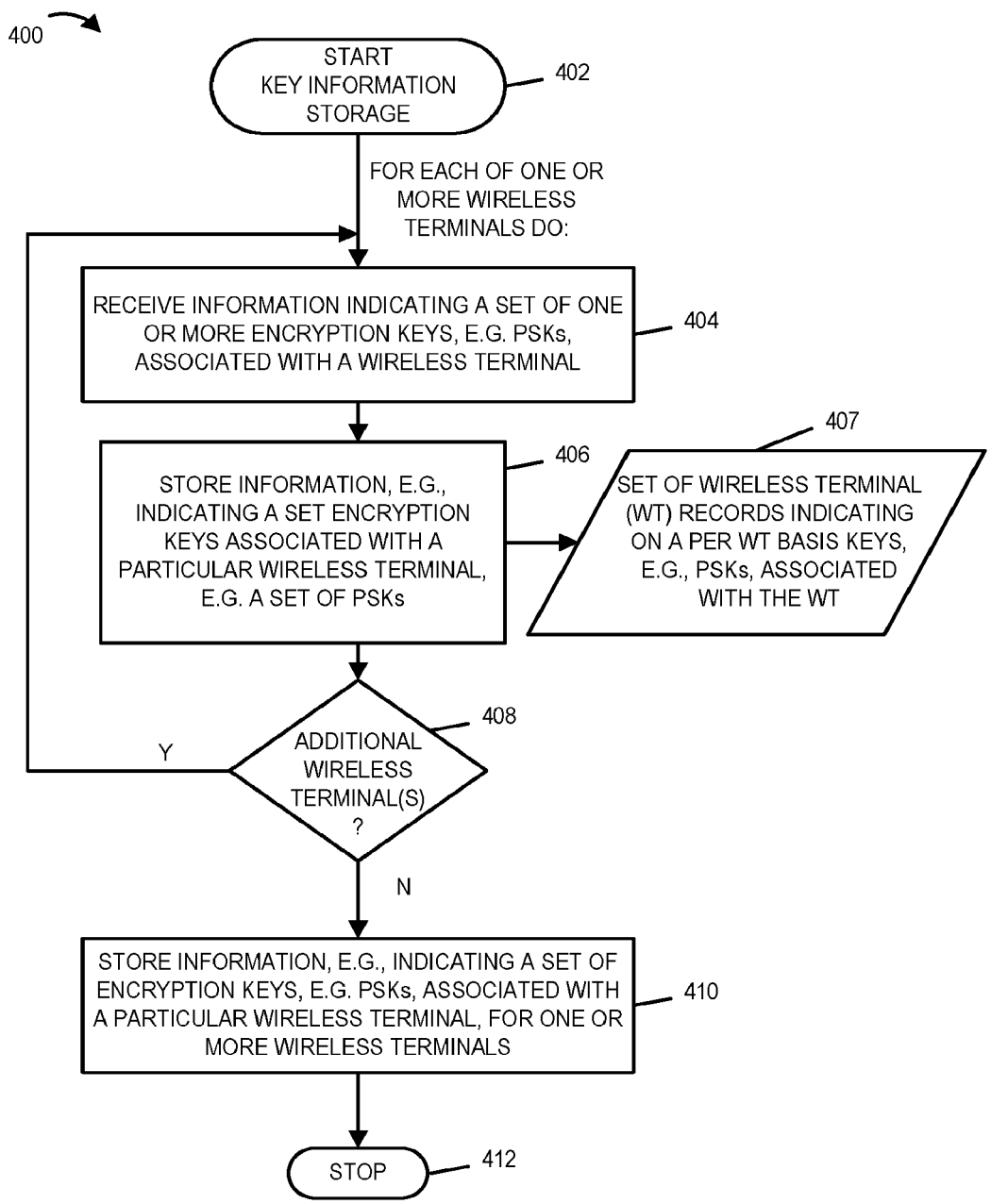
FIG. 4 illustrates a key information storage routine that can be used by a management node or other device in the system of FIG. 1 to create and/or update a key association table such as the one shown in FIG. 3.

FIG. 4 illustrates a key information storage routine that is implemented by the management node 112 and/or the access points 106, 108, 110 of the system of FIG. 1. The routine can and sometimes is used to create a set of key association records such as the one shown in FIG. 3 and which can be used by the access points 106, 108, 110 and/or the management node 112.

For purposes of explaining FIG. 4 it will be assumed that the management device 112 is implementing the method. However it is to be understood that an AP 200 could, and in some embodiments does, implement the method. The method starts in step 402 with the device, e.g., management node 112 or AP 106, 108, 110 being powered on and/or otherwise starting implementing the steps of the method. Operation proceeds from start step 402 to steps 404 with the set of steps beginning with step 404 being performed for each of one or more wireless terminals. In step 404 the device implementing the method receives, e.g., from a wireless terminal or AP serving a wireless terminal a set of one or more encryption keys, e.g., PSKs or other nontransitory keys that are associated with a wireless terminal, e.g., a wireless terminal that is identified by a WT identifier which is supplied with the key information. Then in step 406, information indicating, e.g., a set of encryption keys associated with the particular wireless terminal to which the received information corresponds, is stored. In step 406 a key association record is created and/or updated for the wireless terminal to which received key information corresponds. The record which in many cases will list one or more PSKs associates with a WT, may be, and sometimes is, stored as part of a set of records 407 such as the set shown in FIG. 3.

Operation proceeds from step 406 to step 408 in which a check is made to determine if there are additional wireless terminals for which information is to be received and/or stored. If there are additional wireless terminals for which key association information is to be received and stored, operation proceeds to step 404; otherwise, with the set of records having been completed, operation proceeds to step 410 in which the information indicating a set of encryption keys, e.g. PSKs, associated with one or more wireless terminals is stored e.g., in the management node 112 and/or a storage device in one or more of the access points 106, 108, 110. With the set of records complete and having been stored, the method 400 stops in step 412 until it is activated again, e.g., in response to a new WT being detected at an AP providing key information corresponding to a WT.

In some embodiments WTs provide a list of keys, e.g., PSKs or other long term encryption keys, which they are associated with, e.g., have access to and can use. In other embodiments APs detect what key, e.g., PSK, a WT is using, e.g., by trying multiple PSKs keys to decrypt a message received from the WT, and then associate the key which allowed for successful decoding, e.g., using a temporary key generated from the PSK. In such a case an AP can determine and update a key association table to include at least the PSK it uses to secure communications with a WT. However in some embodiments the APs share such information with the management node 112 and/or other APs allowing a key association record for an individual WT to be updated over time to include keys, e.g., PSKs, used at different APs by the wireless terminal without the WT having to actively participate in the supplying of the information, e.g., list of PSKs, to be included in the key association record.

FIG. 5, which comprises the combination of FIGS. 5A through 5D, shows the steps 500 of a communications method will now be discussed in detail. The method can be implemented by the exemplary system shown in FIG. 1. The method shown in FIG. 5 is a communications method in which access control, e.g., traffic forwarding decisions, are based at least in part on which encryption key, e.g., PSK, was used to secure content communicated from a first WT which acts as a source WT to an AP 106, 108 or 110 for delivery to another WT, e.g., a destination WT. Each of the WTs shown in FIG. 1 are capable of acting as a source or destination AP.

Referring now for purposes of explaining the method shown in FIG. 5, it will be assumed that API 106 is the first access point, WT 1 116 is a source WT and that WT 2 142 is a destination WT. The method 500 starts in step 501 with various components of the system, e.g., access points and/or management node 112 being powered on. Operation proceeds from start step 501 to receive step 502 in which the first access point has a communications exchange with the a WT, e.g., the first WT 1 116 seeking to use AP 1 106 for communications purposes to determine what PSK the WT is going to use to secure communications with the AP 1 106 and to make sure that the AP 1 106 supports the PSK. The communications exchange may, and in some embodiments does, involve the AP 1 supplying a nonce or other value to the WT 1116 as part of a challenge. The WT 1116 uses the nonce and the PSK, e.g., PSK 1, it intends to use to generate a value which the AP 1 can compare to an expected value it generates, e.g., using a PSK known to it. In some embodiments the AP 1 106 generates an expected value for each PSK that can be used to communicate with AP 106. In other cases the expected value is generated for a PSK the WT indicates it intends to use.

Assuming WT 1 responds with a value generated from the supplied nonce and the PSK it intends to use, AP 1 is able to determine which PSK WT 1 is using from the fact that the response will match the expected value generated using the corresponding PSK at AP 1 and supplied nonce known to AP 1. If the response received from the WT to the challenge including the nonce does not match an expected value, AP 1 can determine that WT 1 is using a PSK which is not supported by AP 1 and communication with AP 1 should be denied.

In some but not necessarily all embodiments the security communications exchange step 502 includes steps 503, 504 and step 505. In step 503 AP 1 provides a challenge, e.g., nonce, to the first WT 1 116. Then in step 504 AP 1 106 receives a response to the challenge, e.g., a value generated by WT 1116 using the nonce and the PSK, e.g., PSK 1, as inputs to a hash or other function. In step 505 API 116 determines from the respond to the challenge which PSK is being used by the WT, e.g., by determining that the received response value matches an expected response value generated at AP 1 from the nonce and PSK 1, the AP 1 106 is able to determine that WT 1 116 is using PSK 1 to communicate with AP 1 106.

In some embodiments step 505 includes step 506 which involves the AP 1 106 trying a plurality of PSKs to determine which one, when used with the nonce, produces a result that matches the received response. In this way it is possible to determine what supported PSK a WT is using even if the WT does not expressly indicate, e.g., identify, the PSK it is using. If the response is determined not to correspond to a supported PSK communications between the WT 1116 and AP 1 106 will be blocked. However, for purposes of this example WT 1116 uses PSK 1117 which is supported by AP 1 106.

The communications exchange step 503 will be performed for each WT seeking to communicate with an AP, e.g., AP 1 106. In this way by the time traffic is to be communicated with through the AP 1 106, the AP 106 will be aware of the PSK being used by an individual WT 1116 with which it is communicating. A temporary key to be used for encrypting/decrypting communications between the WT 1 and AP 1 106 is normally generated following determination of the PSK being used with the determined PSK being used in generating the temporary key. Thus while the determined PSK is used to secure the communications between WT 1116 and AP 1 106, this is done via the use of a key generated from or using the PSK.

The arrow from the output of step 503 back to the start of step 503 is intended to indicate that step 503 is performed for each WT which attaches or communicates through AP 1 106.

With the PSK being used by WT 1116 know as a result of the processing in step 502, operation proceeds from step 502 to step 507. In step 507 key association information is updated at AP 1 106 to indicate that the determined encryption key, e.g., PSK, is being used by the WT for which step 502 was performed. For example in step 507 key association information in a storage device, e.g., memory of AP 1 106, will be updated to indicate that PSK 1 117 is being used at AP 1 106 to communicate with the first WT 1 116. The use of PSK 1 is shown in record 107 for WT 1 as shown in FIG. 1.

In step 507 the key association record for the source WT 1 116, in the AP 1 106 as well as the key association table in the management node 112 are updated. Updating of the key information in the management node 112 is achieved in some embodiments by the AP 1 106 sending the key information to the management node 112. Over time as the management node receives key information for a WT derived by different APs that communicate with the WT, e.g., using different PSKs, a set of PSKs corresponding to the WT can be generated even though a single PSK maybe used by a WT to secure communications with a particular AP.

Operation proceeds from step 507 to step 509 via connecting node 508. Step 509 represents the start of the use of the AP 1 106 by the WT 1 116 to communicate a message to another WT, e.g., WT 2 118.

In step 509 the first access point 106 receives from WT 1116a first message directed to a second WT 118 with the first message being secured using the PSK, e.g., PSK 1117 being used by WT 1 116 to secure communications with AP 1 106. Operation proceeds from receive step 509 to step 510 in which the first access point AP 1 106 determines from stored information the encryption key, e.g., the temporary key corresponding to PSK 1, that the first WT is using to encrypt communications from WT 1 116 to AP 1 106.

Operation proceeds from step 510 to step 513 in which the first AP 1 106 decrypts the encrypted data received from the first WT 1 106, e.g., using the temporary encryption key generated from PSK 1 that is being used to secure communications between WT 1116 and AP 1 106.

Figure 5A:
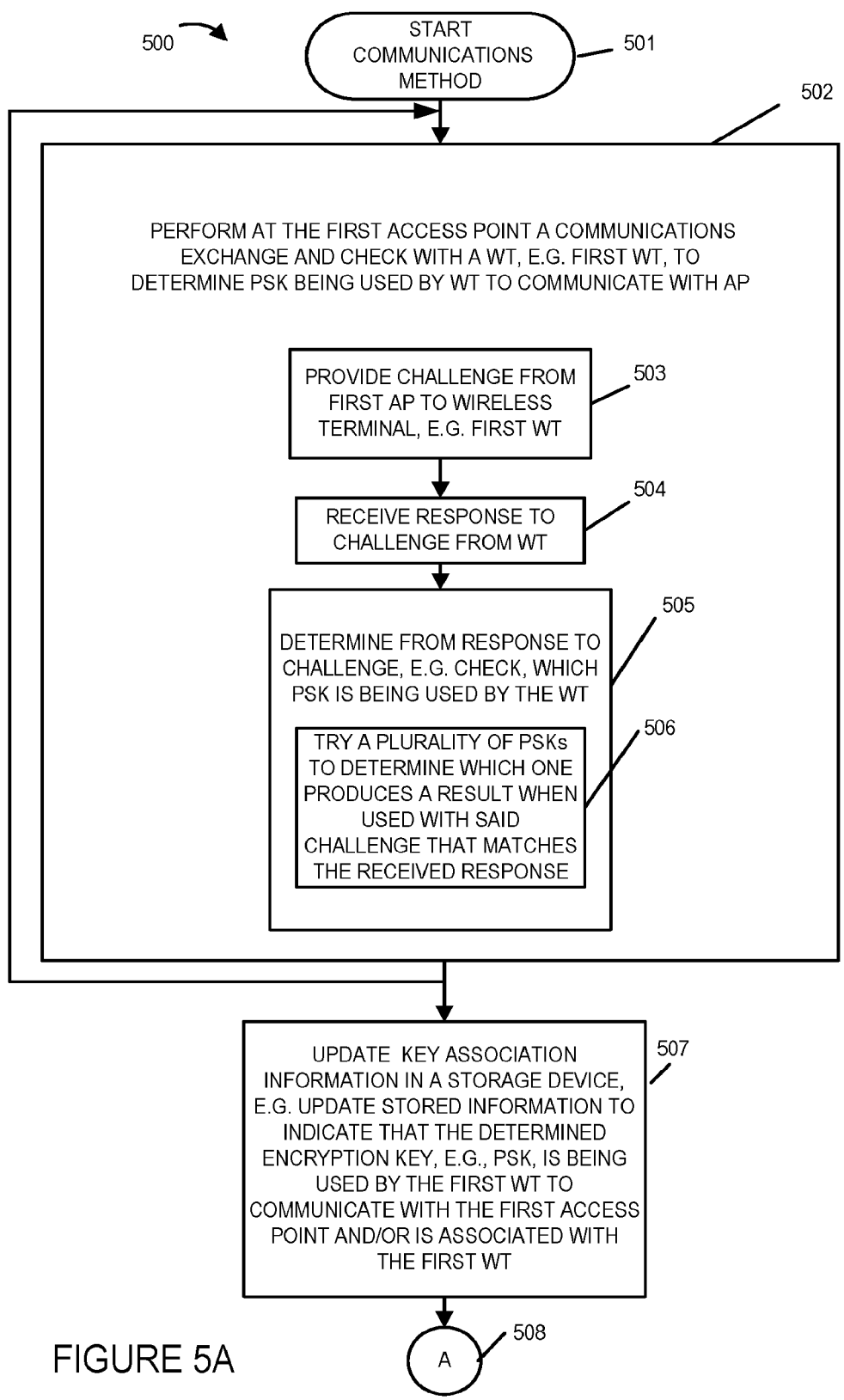
FIG. 5A is a first part of a communications method implemented in accordance with one exemplary embodiment of the invention.
Figure 5B:
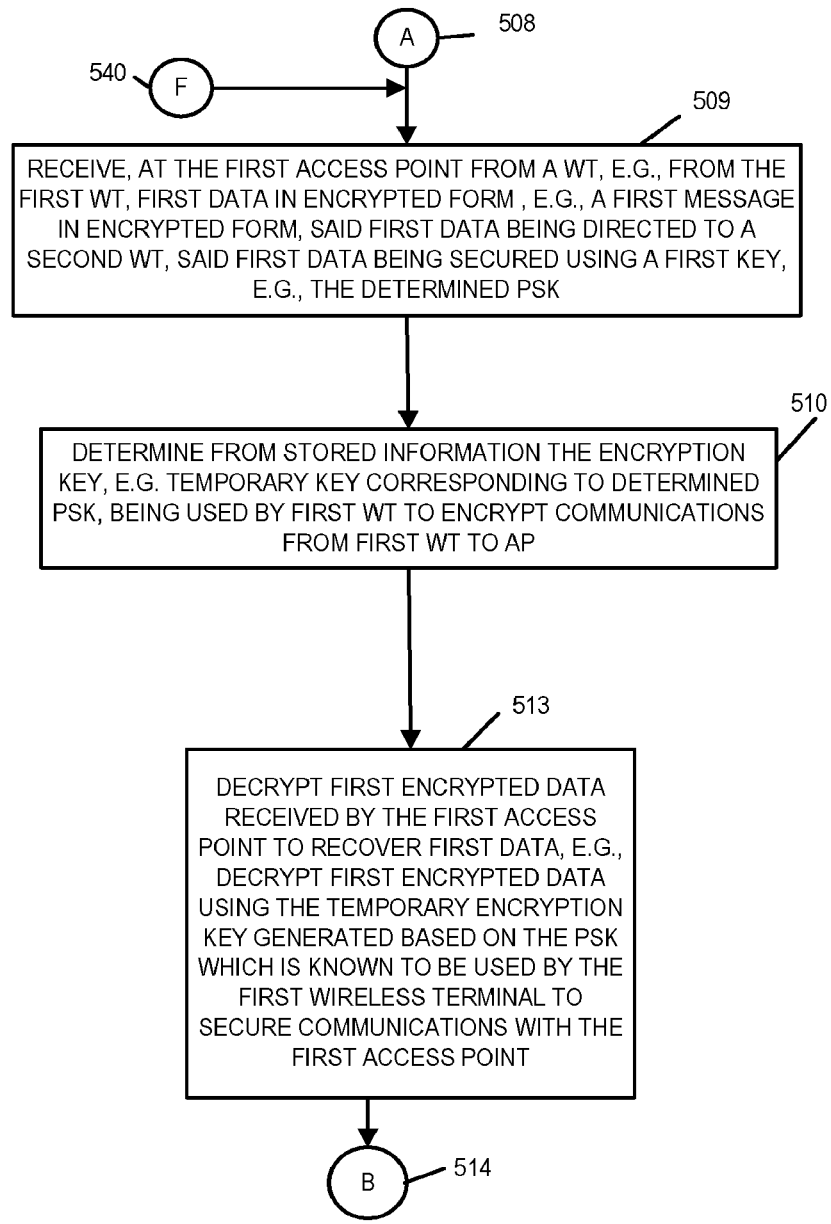
FIG. 5B is a second part of a communications method implemented in accordance with one exemplary embodiment of the invention.
Figure 5C:
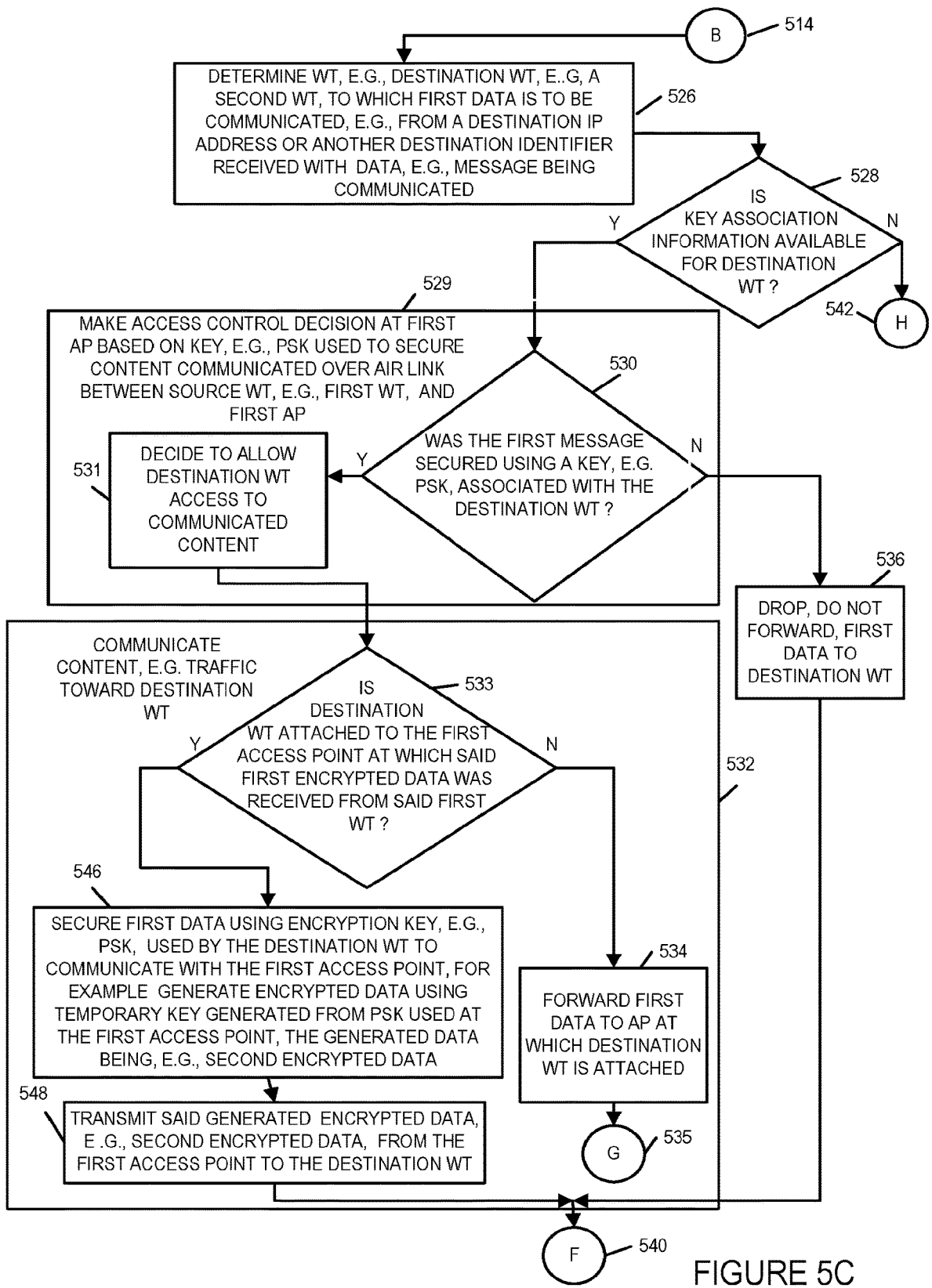
FIG. 5C is a third part of a communications method implemented in accordance with one exemplary embodiment of the invention.
Figure 5D:
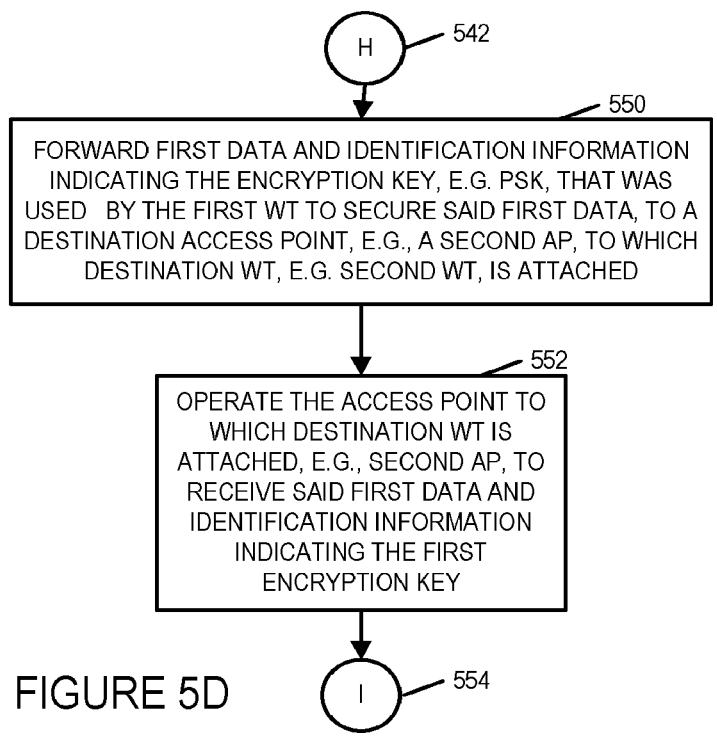
FIG. 5D is a fourth part of a communications method implemented in accordance with one exemplary embodiment of the invention.

With the received encrypted content having been decrypted by the AP 1 106 in step 513 operation proceeds from step 513 via connecting node 514 to step 526 shown in FIG. 5C. In step 526 the destination of the received traffic is determined, e.g., the destination WT 2 118 is identified from a destination address, e.g., destination IP address, or another destination identifier received from the source WT 1 116.

Operation proceeds from step 526 to step 528. In step 528 the first AP 1116 which receives the traffic over an air link from the source WT 1116 checks key association information available to it to determine if key association information for the destination WT 2 118 is available, e.g., for use in making an access control decision such as a traffic forwarding or delivery decision. If the destination WT 2 is attached to the first AP 1 it will have at least knowledge of the key it uses to secure communication with WT 2 and/or key association information provided by WT 2 which maybe used in making an access control/forwarding decision.

If in step 528 it is determined that the first AP 1 106 which received the traffic from the source device WT 1116, has the key association information for the destination device operation proceeds from step 528 to access control step 530. In essence, step 528 decides if the AP 1 106 to which the content was sent from the source device has the key information relating to the destination device WT 2 118 which may or may not be attached to API 106. This information is used to make an access control decision based on the encryption key used to secure the content, e.g., message, sent over the air link to the AP 1 106 for delivery to WT 2 118.

In step 529 an access control decision with regard to the received content that has been decrypted is made based on the key used to secure the content that was sent in encrypted form over the air link to AP 1 106. In step 529, in some embodiments in step 530 the key used to successfully decrypt the first encrypted content that was received from the source device is checked to determine if corresponds to a PSK that is associated with the destination WT, e.g., WT 2 118. That is, a determination is made if WT 2 is associated with the PSK used by WT 1 116 to secure the message to be communicated to WT 2. If the key, e.g., PSK 1, originally used to secure the communications link over which the content was sent is not associated with the destination WT 2 119, the decision is not to allow access to the content and operation proceeds along the no path from step 530 to step 536 where the AP 1 106 takes an action not to forward the message received from WT 1 116 to the destination device, e.g., drops the content without forwarding. Operation proceeds from step 536 to step 504 via connecting node F 540

If in step 530 it is determined that the destination device WT 2 is associated with the key, e.g., PSK 1, that was used to secure the received content, the decision is made in step 531 to allow the destination device access to the communicated content and then operation proceeds to step 532 in which the content, e.g., traffic, received from the source WT 1116 and which was decoded is communicated to the destination device, e.g., WT 2. The communication to the destination device may and sometimes does include forwarding the content to another AP, e.g., AP 2 108 for delivery. In substep 533 which is part of step 532 in some embodiments, a decision is made as to whether or not the destination WT 2 118 is attached to the first AP 1 106 which received and decoded the content to be delivered. If it is determined that the destination AP is not attached to the first AP 1 106, operation proceeds to step 534 with the first AP which received and decoded the content forwarding the content, e.g., traffic such as data or a message, to the AP, e.g., AP 2 108 to which the destination WT 2 118 is attached for delivery to the destination WT 118 by the AP 2 108 to which it is attached. A secure tunnel 132 may be and sometimes is used to forward the content to the AP 108 to which the destination WT 2 118 is attached. The destination AP 108, to which the content is forwarded for delivery will secure the communicated content using the key PSK 4 which AP 2 118 uses at the destination AP 2 108 to secure communications between AP 2 108 and the destination WT 2 118. The PSK used to secure the over the air transmission to the destination WT 2 218 maybe and often is different from the key used by the source device to secure the initial transmission of the content over the air link to AP 1 106. As should be appreciated the actual transmission between AP 2 108 and WT 2 118 may be and sometimes is encrypted using a temporary key generated from the PSK 4 used to secure communications between WT 2 118 and AP 2 108. With the data being forwarded for delivery in step 534 operation proceeds from step 535, via connecting node G 535 to step 560.

If in step 533 it was determined that the destination WT 2 118 was attached to the same AP, e.g., AP 1 106 as the source WT 1116, operation proceeds from step 533 to step 546 wherein the content, e.g., traffic, to be communicated to destination WT 2 118 will be secured using PSK 1 that is used to used to secure communication between the first AP 1 106 and the second WT 2 when attached to AP 1 106. Securing the message to be sent to WT 2 may, and sometimes does, involve encrypting the message using a temporary key generated from PSK 1 with the temporary key being used to encrypt/decrypt communications over the air to WT 2 118.

Operation proceeds from step 546 to step 548 where the encrypted content, e.g., traffic data, generated in step 546 is transmitted by AP 1 over the air link 142 to the destination WT 2 118. Then operation returns to step 509 via connecting node 540.

In step 528 if it was determined, e.g., by AP 1, that the first access point AP 1 106 which received the content from the source device WT 1116 does not have the key association information available for the destination WT 2, e.g., because there is no management device 112 to supply the key information or because the key information for the destination device is present at the destination AP 2 118 to which the destination WT 2 is attached but not else where, operation proceeds via connecting node H 542 to step 550.

In step 550 API forwards the content, e.g., traffic data, received from the source WT 1116 along with information indicating the key, e.g., PSK 1, that was used to secure, the content from the source WT 1118 when it was sent over the air link to the source AP 106. The content and key information is forwarded to the destination AP, e.g., the second AP 108 to which the destination WT 2 118 is attached.

Then in step 552 the destination AP, e.g., second AP 108 to which the destination device WT 2 118 is attached receives the information sent by the first AP 1 106, e.g., traffic data to be delivered, information about the key used to originally secure the content as well as information, e.g. a destination identifier such as an address identify the destination device. A source WT 1116 identifier will also normally be communicated with the content to be delivered.

Figure 5E:
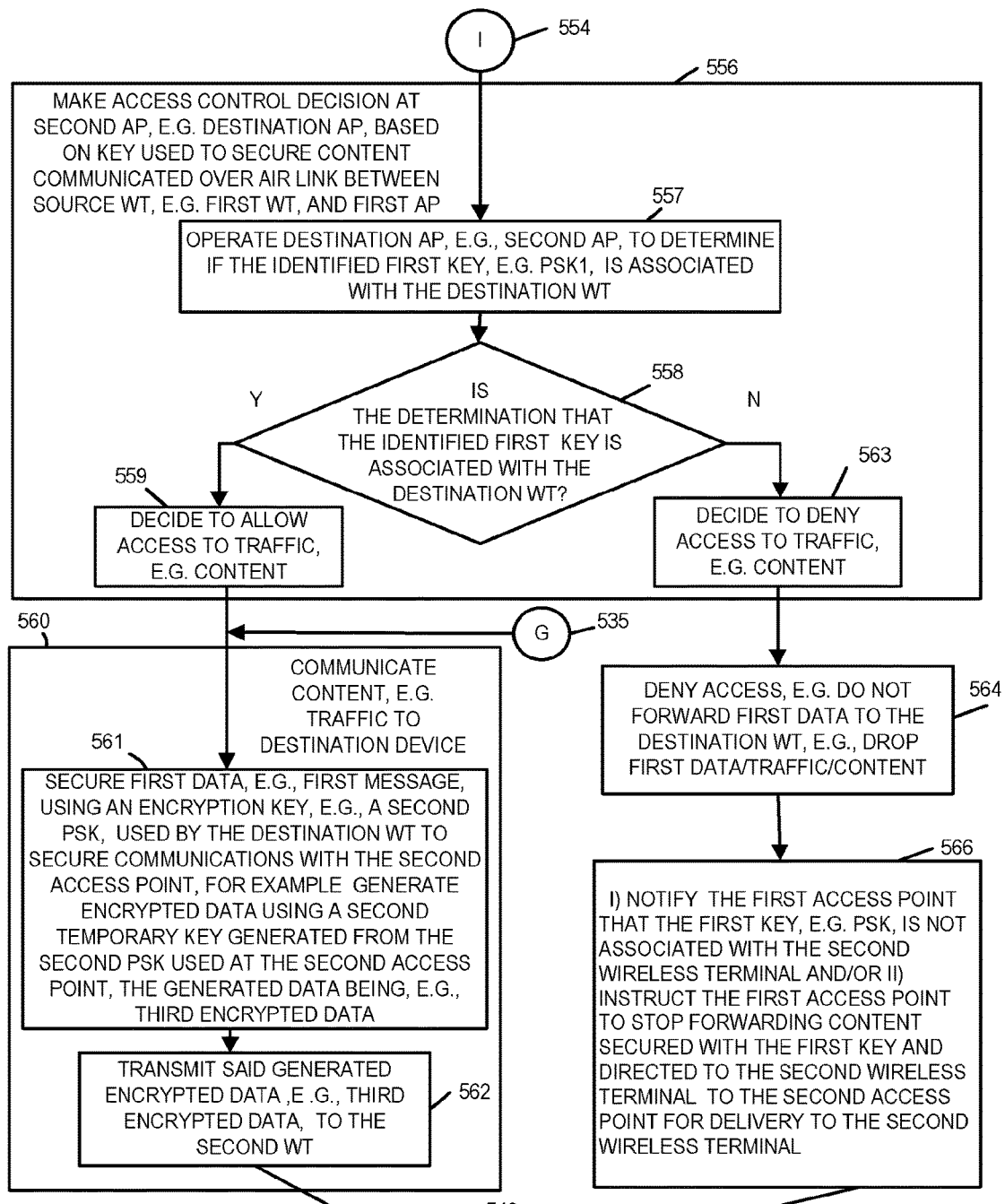
FIG. 5E is a fifth part of a communications method implemented in accordance with one exemplary embodiment of the invention.

Operation proceeds from step 552 to step 556 shown in FIG. 5E via connecting node I 554. In step 556 the destination AP, e.g., the second AP 118 makes an access control decision based on the key, e.g, PSK 1, that was used to secure the traffic when it was sent over the air link from the source WT 1 116 to the first AP 116. This step involves checking to see if the destination WT is associated with the key, e.g. PSK 1, that was used to secure the content when it was sent over the first air link 140.

In some embodiments step 556 includes step 557 wherein the destination AP, e.g., AP 118, determines if the identified key, PSK 1, used to originally secure the content, is associated with the destination WT 2 118. Operation proceeds from step 557 to step 558 in which the outcome of the determination in step 557 is checked to demine if operation should proceed to allow access decision step 559 or deny access decision step 563.

Consider for example that WT 2 108 is associated with PSK 1 and would be able to receive content sent by WT 1 and secured with PSK 1 on the link 140 to AP 1 106 where it is decoded. But if WT 3 160 was the destination device the outcome is very different and WT 3 would be blocked from receiving the message sent by WT 1 and secured with PSK 1 since WT 3 does not have access to and does not use PSK 1. Thus in accordance with various embodiments if WT 1 sent via AP 1 a message to WT 3 that was secured with PSK 1 when transmitted to AP 1 106, WT 3 would be blocked, e.g., in step 564 from receiving the data.

If it is determined in step 558 that the key, e.g, PSK 1, used to secure the content sent by the source device WT 1 116 is not associated with destination device, operation proceeds from step 558 to step 563 in which a decision is made to deny the destination device WT 3 118 access to the traffic, e.g., data, content or message. However in the example where WT 2 is the destination device WT 2 is associated with PSK 1 and thus would be allowed to receive a message sent to AP 1 that was secured using PSK 1.

Operation proceeds from step 563 to step 564 in which the destination device WT, e.g., WT 3, is denied access to the content sent by the source device WT1 116, e.g., by not forwarding the content to the destination device, e.g., dropping the traffic/content. In the case of content being dropped, WT 3 with which does not have access to PSK 1 is a good example of a destination device which would be blocked from receiving content sent by WT 1 when at AP 1 106.

Operation proceeds from step 564 to step 566 which is implemented in some but not necessarily all embodiments. In step 566 the destination AP 108 sends the source AP 106 a message notifying the first access point AP 1 106 that the first key is not associated with the destination WT and/or a message to stop forwarding traffic received from the first WT 1 106 that is directed to the destination device, e.g., WT 3, which lacks the necessary key association for delivery given the delivery constraint imposed in some embodiments so that the first AP 106 can stop forwarding of the traffic which is being dropped by the second AP 108. In this way resources for forwarding traffic which will be dropped by AP 2 108 can be conserved by providing AP 1 the information needed to make the AP aware that it should drop the content to which access will be denied if forwarded to AP 2 108. Operation proceeds from step 565 to step 509 via connecting node F 540.

In step 558 if it is determined that the first key, e.g., PSK 1, which was used to secure the communicated traffic when it was sent to the first AP 1 106 is associated with the destination WT, e.g., WT 2 118, operation proceeds from step 558 to step 559 in which the second AP decides to allow the destination WT, e.g., WT 2 116, access to the traffic. Operation proceeds from step 559 to step 560 in which the second AP 108 communicates the traffic, e.g. content sent from the first WT 1 106 to the destination WT 2 108. Communication step 560 in some embodiments include encryption step 561 in which the content to be communicated is secured with a key, e.g., PSK 4, used by the second AP 108 to secure communication with the destination WT 2. Securing step 561 may and sometimes does include encrypting the message to be delivered with a temporary encryption key generated from the PSK 4 being used to secure communications between the destination AP 2 108 and the destination WT 2 118. Once encrypted the traffic, e.g, message is sent over the air link to the destination device in step 562. Note that in this example when WT 2 is at AP2 the content sent by WP1 will be encrypted and sent over air link 144 using PSK 4 to secure the communication between AP 2 and WT 2. Securing the communication may, and sometimes does, involve encrypting the content using a temporary encryption key generated based on the PSK, e.g. PSK 4, used to secure the communication. Operation proceeds from step 562 to step 509 via connecting node F 540.

In the above described manner, the encryption key used to originally secure data can be taken into consideration, even after decoding and/or forwarding of data, at a node in the communications network which performs an access control operation. Thus while the original key used to secure a communication, e.g., PSK, is not required to be used for the end transmission. However, in at least some embodiments the device to which the content is directed is required to be associated with the original key, e.g., have access to or be entitled to use the key or access to the content will be blocked.

Communications between access points maybe and sometimes is secured with encryption but the encrypted content is normally decrypted at the AP receiving the content. In accordance with some embodiments encryption for intermediate transmission of data, e.g., as part of using a secure tunnel, does not preclude the use of the access control techniques of the invention. Encryption for communication between APs is used in some embodiments to add a level of security between APs that might be lacking in systems where links between APs are not secured. However, the use of encryption between APs is not required or necessary for all embodiments.

Various embodiments support and permit the use of multiple PSKs on a WLAN, and allow multiple clients, e.g., wireless terminals and/or their users, to share the same PSK.

The various embodiments PSKs used to communicate with an access point are used in an access control function (WxLAN) which allows and sometimes involves use of rules, e.g., access and forwarding rules, that are set based on which key, e.g., PSK or other long term key, is used to secure a communication with an AP. This can be used to only allow wireless stations to communicate only if they use the same PSK. This applies both to wireless stations on the same access point and on different access points.

The use of common PSKs does not provide this naturally since the PSK cryptography itself is only used to protect over-the-air data between the access point and wireless station, and isn't used in station-to-station communication.

The access control rules can apply to traffic between wireless stations on a common access point and to traffic between wireless stations on different access points. For instance, if a user connects to a lobby access point using the same PSK that their hotel room devices are using, they can access their hotel room devices.

Consider the following exemplary use case where the access control invention is used with two students.

Student A is assigned PSK1, and joins the WLAN using that key on their iPhone and AppleTV. Student B is assigned PSK2, and joins the WLAN using that key on their laptop computer and printer access control can restrict student A to only be able to communicate with the Internet and between their iPhone and AppleTV. Student A's iPhone and AppleTV are not able to communication with student B's laptop computer or printer. The same applies to student B (student B can not communicate with student A's devices since they use a different PSK which is not associated in the access control component.

This does not restrict the use of additional access control rules. For instance, both students can be allowed to access shared resources like school computers and printers.

In some embodiments proper function of the access control and/or forwarding can be tested by connecting two computers to a WLAN with the devices using the same key and verifying that they can communicate In addition 2 computers can be connected to the WLAN using different keys that are not associated with one another in the access control component and verification check can be made to make sure the 2 devices using different keys which are not associated with one another are not able to communicate.

Tunnels can be used between the APs, or from the APs to a tunnel aggregator, and transport traffic selectively among wireless stations using the same key. Consider for example, a user at work using a work access point. The user can connect to an IoT devices at home since and use the same PSK even though a firewall, because of the tunnel component.

Similar functionality can and sometimes is supported for 802.1x with wireless clients that use the same 802.1x credentials username/password for EAPTTLS, certificate for other authentication methods. The credentials used for 802. IX by a user can be, and sometimes are, selectively bound, e.g., associated, thereby associating 802.1x and PSK credentials of a user to allow a wireless station using either access method to join a common personal WLAN and communicate traffic with access control and forwarding being based on the 802. IX security information and/or PSK credentials.

Figure 6A:
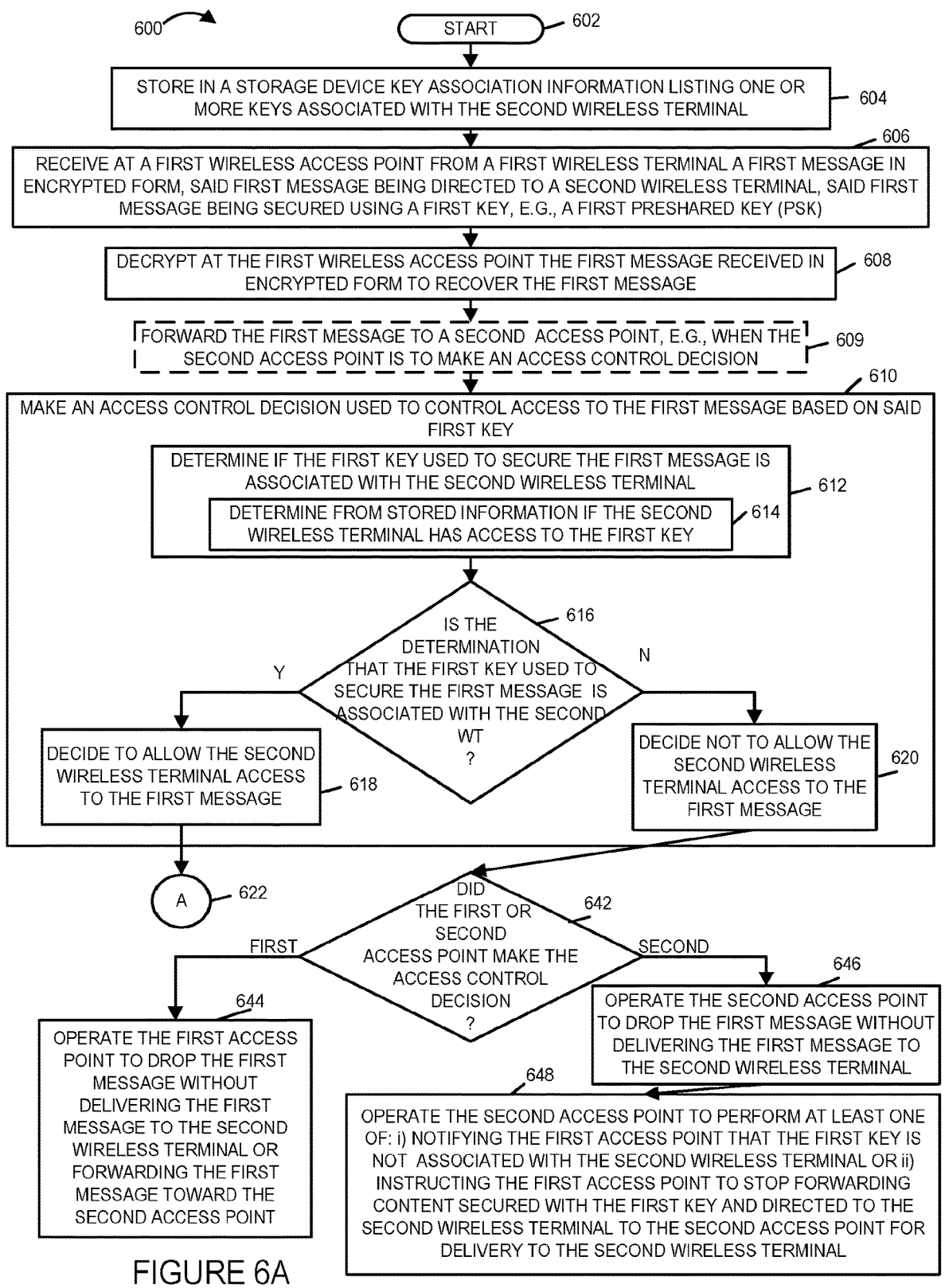
FIG. 6A is a first part of a flowchart of an exemplary communications method in accordance with and exemplary embodiment.
Figures 6, 6A, 6B:
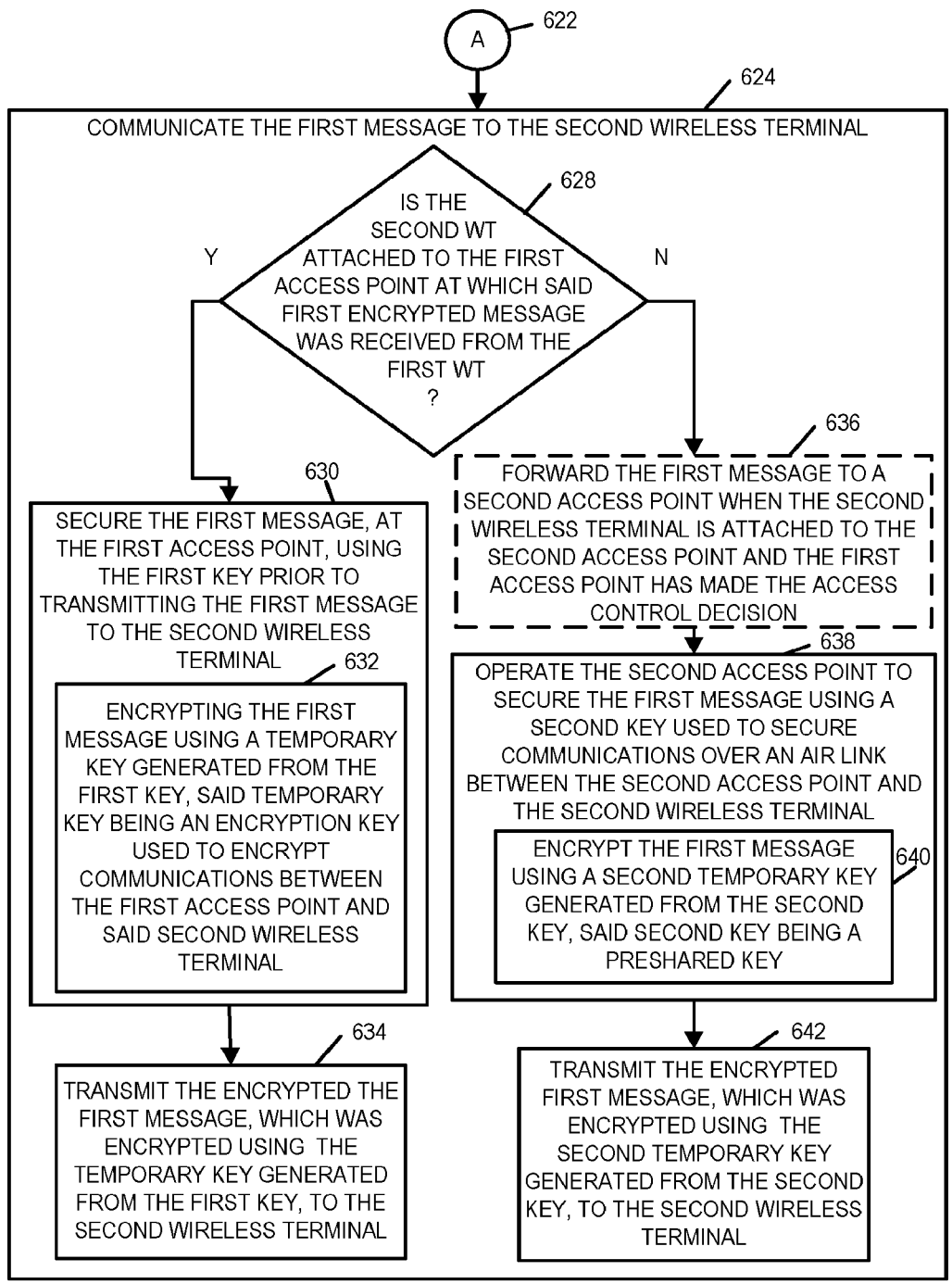
FIG. 6B is a second part of a flowchart of an exemplary communications method in accordance with an exemplary embodiment.
FIG. 6 comprises the combination of FIG. 6A and FIG. 6B.

FIG. 6, comprising the combination of FIG. 6A and FIG. 6B, is a flowchart 600 of an exemplary communications method in accordance with an exemplary embodiment. Operation starts in step 602 and proceeds to step 604. In step 604 key association information is stored in a storage device, said key association information listing one or more keys associated with a second wireless terminal. In some embodiments, the storage device is included in a management node which stored wireless terminal (WT) key association records and makes the information in the key association records available to one or more access points. Operation proceeds from step 604 to step 606.

On step 606 a first wireless access point receives from a first wireless terminal a first message in encrypted form, said first message being directed to a second wireless terminal, said first message being secured using a first key, e.g., a first preshared key (PSK). Operation proceeds from step 606 to step 608.

In step 608 the first wireless access point decrypts the first message received in encrypted form to recover the first message. In some embodiments, e.g., an embodiment in which the first access point is to make the access control decision of step 610, operation proceeds from step 608 to step 610. In some other embodiments, e.g., an embodiment in which the second access point is to make the access control decision of step 610, operation proceeds from step 608 to step 609. In step 609 the first access point forwards the first message to the second access point. In various embodiments, in step 609 the first access point forwards the first message and identification information indicating the first encryption key, e.g., the first PSK, that was used by the first WT to secure the first message, to the second access point to which the second WT is attached. Operation proceeds from step 609 to step 610.

In step 610 an access point, e.g., the first or second access point, makes an access control decision used to control access to the first message based on said first key. For example, in some embodiments, if the key association information for the second wireless terminal is available to the first access point, then the first access point makes the access control decision of step 610; otherwise the second access point makes the access control decision of step 610.

In some embodiments, if the second wireless terminal is coupled to the first access point the first access point performs step 610 and makes an access control decision. In some embodiments, if the second wireless terminal is coupled to the second access point and the first access point is unable to make the access control decision, then the second access point performs step 610 and makes an access control decision.

Step 610 includes steps 612, 616 and 618. In step 612 the access point, which is making the access control decision, determines if the first key used to secure the first message is associated with the second wireless terminal. Step 612 includes step 614 in which the access point determines from stored information if the second wireless terminal has access to the first key. Operation proceeds from step 612 to step 616.

In step 616 if the determination is that the first key used to secure the first message is associated with the second wireless terminal, then operation proceeds from step 616 to step 618, in which the access point decides to allow the second wireless terminal access to the first message. Operation proceeds from step 618, via connecting node A 622 to step 624. However, in step 616 if the determination is that the first key used to secure the first message is not associated with the second wireless terminal, then operation proceeds from step 616 to step 620, in which the access point decides to not allow, e.g., deny, the second wireless terminal access to the first message. Operation proceeds from step 620 to step 642.

In step 642, if the first access point made the access control decision of step 610, then operation proceeds from step 610 to step 644, in which the first access point drops the first message without delivering the first message to the second wireless terminal or forwarding the first message toward the second access point. In step 642, if the second access point made access control decision of step 610, then operation proceeds from step 610 to step 646, in which the second access point drops the first message without delivering the first message to the second wireless terminal. Operation proceeds from step 646 to step 648. In step 648 the second access point is operated to perform at least one of i) notifying the first access point that the first key is not associated with the second wireless terminal or ii) instructing the first access point to stop forwarding content secured with the first key and directed to the second wireless terminal to the second access point for delivery to the second wireless terminal.

Returning to step 624, in step 624 the first message is communicated to the second wireless terminal. Step 624 includes steps 628, 630, 632 634, 636, 638, 640 and 642. In step 628 if the second wireless terminal is attached to the first wireless access point at which said encrypted message was received from the first wireless terminal, then operation proceeds from step 628 to step 630; otherwise, operation proceeds from step 628 to step 636 or step 638.

In step 630 the first wireless access point secures the first message at the first access point using the first key prior to transmitting the first message to the second wireless terminal. Step 630 includes step 632 in which the first wireless access point encrypts the first message using a temporary key generated from the first key, said temporary key being an encryption key used to encrypt communications between the first access point and the second wireless terminal. Operation proceeds from step 630 to step 632. In step 632 the first wireless access point transmits the encrypted first message which was encrypted, e.g., in step 632, using the temporary key generated from the first key, to the second wireless terminal.

In step 636 the first access point forwards the first message to a second access point when the second wireless terminal is attached to the second access point and the first access point has made the access control decision of step 610. Operation proceeds from step 636 to step 638. In step 638 the second access point is operated to secure the first message using a second key used to secure communications over an air link between the second access point and the second wireless terminal. Step 638 includes step 640 in which the second access point encrypts the first message using a second temporary key, said second key generated from the second key, said second key being a preshared key. Operation proceeds from step 638 to step 642 in which the second wireless access point transmits the encrypted first message, which was encrypted using the second temporary key from the second key, e.g., in step 640, to the second wireless terminal.

In some embodiments, the first and second access points are WiFi access points. In some embodiments, the first access point is a WiFi access point and the second access point is an LTE access point, said second access point using a different wireless communications protocol than said first access point. In some embodiments, the first access point is a WiFi access point and the first key is a first PSK key and the second access point is an LTE base station.

FIG. 7 is a drawing of an exemplary assembly of components 700 which may be included in an exemplary access point, e.g., any of access points 106, 108, 110 of FIG. 1 and/or access point 200 of FIG. 2, in accordance with an exemplary embodiment. Assembly of components 700 can be, and in some embodiments is, included and used in access point 200, e.g., a base station. The components in the assembly of components 700 can, and in some embodiments are, implemented fully in hardware within the processor 206, e.g., as individual circuits. The components in the assembly of components 700 can, and in some embodiments are, implemented fully in hardware within the assembly of hardware components 208, e.g., as individual circuits corresponding to the different components. In other embodiments some of the components are implemented, e.g., as circuits, within the processor 206 with other components being implemented, e.g., as circuits within assembly of components 208, external to and coupled to the processor 206. As should be appreciated the level of integration of components on the processor and/or with some components being external to the processor may be one of design choice. Alternatively, rather than being implemented as circuits, all or some of the components may be implemented in software and stored in the memory 212 of the access point 200, with the components controlling operation of device 200 to implement the functions corresponding to the components when the components are executed by a processor, e.g., processor 206. In some such embodiments, the assembly of components 700 is included in the memory 212 as assembly of component, e.g., assembly of software components 218. In still other embodiments, various components in assembly of components 700 are implemented as a combination of hardware and software, e.g., with another circuit external to the processor providing input to the processor 206 which then under software control operates to perform a portion of a component's function. While processor 206 is shown in the FIG. 2 embodiment as a single processor, e.g., computer, it should be appreciated that the processor 206 may be implemented as one or more processors, e.g., computers.

When implemented in software the components include code, which when executed by the processor 206, configure the processor 206 to implement the function corresponding to the component. In embodiments where the assembly of components 700 is stored in the memory 212, the memory 212 is a computer program product comprising a computer readable medium comprising code, e.g., individual code for each component, for causing at least one computer, e.g., processor 206, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the access point 200 or elements therein such as the processor 206, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method, e.g., one or more steps of the method of FIG. 5, and/or FIG. 6.

Figure 7A:
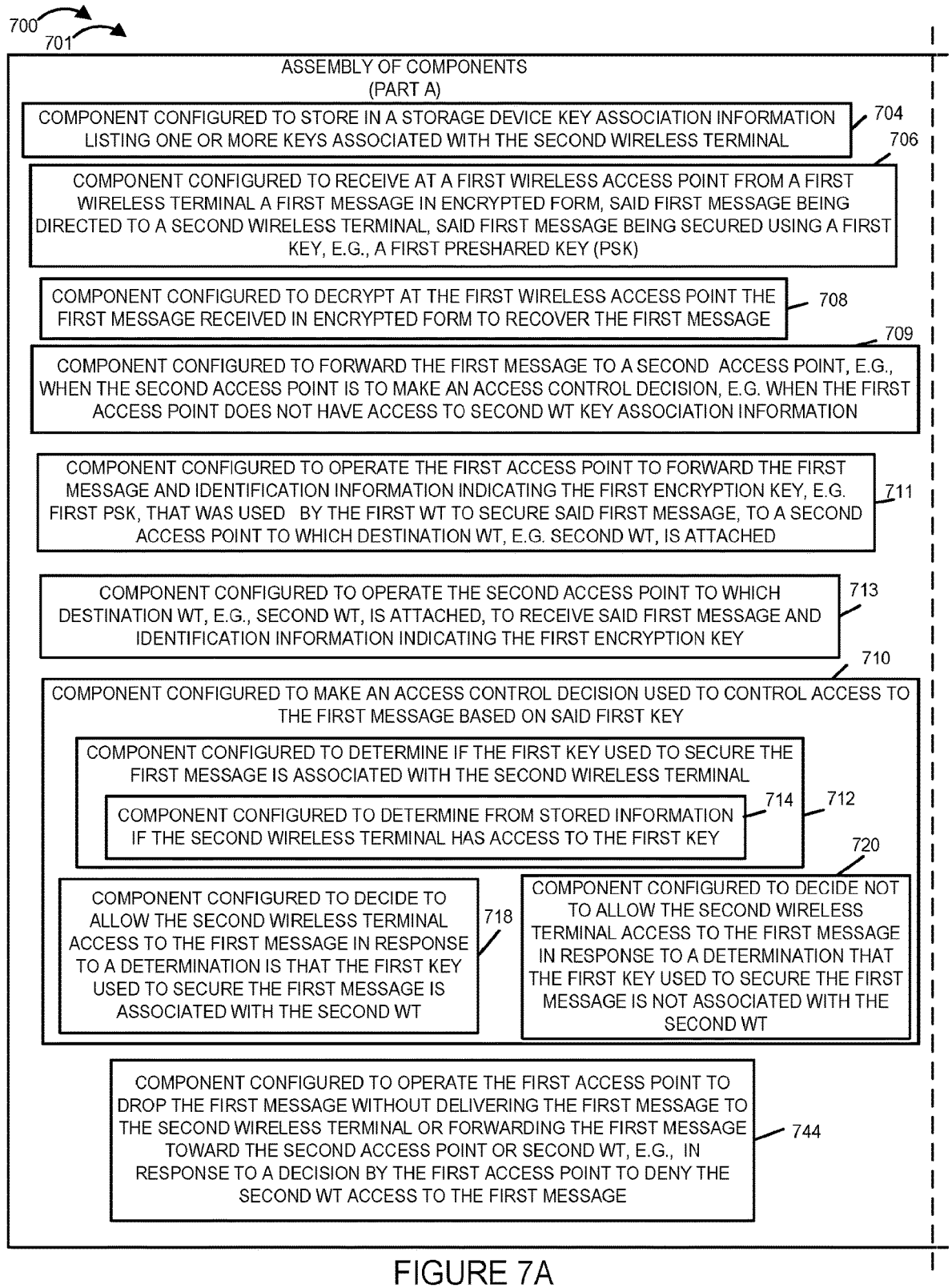
FIG. 7A is a first part of an exemplary assembly of components which may be included in an exemplary access point, in accordance with an exemplary embodiment.

FIG. 7, comprising the combination of FIG. 7A and FIG. 7B is a drawing of an exemplary assembly of components 700, comprising the combination of Part A 701 and Part B 703, which may be included in an exemplary access point in accordance with an exemplary embodiment. Assembly of components 700 includes a component 704 configured to store in a storage device key association information listing one or more keys associated with the second wireless terminal, a component 706 configured to receive at a first wireless access point from a first wireless terminal a first message in encrypted form, said first message being directed to a second wireless terminal, said first message being secured using a first key, e.g., a first preshared key (PSK), and a component configured to decrypt at the first wireless access point the first message received in encrypted form to recover the first message.

Assembly of components 700 further includes a component 709 configured to forward the first message to a second access point, e.g., when the second access point is to make an access control decision, e.g., when the first access point does not have access to second wireless terminal key association information, a component 711 configured to operate the first access point to forward the first message and identification information indicating the first encryption key, e.g., first PSK, that was used by the first WT to secure said first message, to a second access point to which the destination WT, e.g., the second WT, is attached, and a component 713 configured to operate the second access point to which the destination WT, e.g., the second WT, is attached to receive said first message and identification information indicating the first encryption key.

Assembly of components 700 further includes a component 710 configured to make an access control decision used to control access to the first message based on said first key. Component 710 includes a component 712 configured to determine if the first key used to secure the first message is associated with the second wireless terminal including a component 714 configured to determine from stored information if the second wireless terminal has access to the first key. Component 710 further includes a component 718 configured to decide to allow the second wireless terminal access to the first message in response to a determination that the first key used to secure the first message is associated with the second WT, and a component 720 configured to decide not to allow the second wireless terminal access to the first message in response to a determination that the first key used to secure the first message is not associated with the second wireless terminal.

Assembly of components 700 further comprises a component 744 configured to operate the first access point to drop the first message to the second wireless terminal without delivering the first message to the second wireless terminal or forwarding the first message toward the second access point or second WT, e.g., in response to a decision by the first access point to deny the second wireless terminal access to the first message, a component 746 configured to operate the second access point to drop the first message without delivering the first message to the second wireless terminal, e.g., in response to a decision by the second access point to deny the second WT access to the first message, and a component 748 configured to operate the second access point to perform at least one of: i) notifying the first access point that the first key is not associated with the second wireless terminal or ii) instructing the first access point to stop forwarding content secured with the first key and directed to the second wireless terminal to the second access point for delivery to the second wireless terminal, e.g., in response to a decision by the second access point to deny the second WT access to the first message.

Assembly of components 700 further includes a component 750 configured to operate the first access point to communicate the first message to the second wireless terminal. Component 750 includes a component 730 configured to secure the first message at the first access point using the first key prior to transmitting the first message to the second wireless terminal, and a component 734 configured to transmit the encrypted first message which was encrypted using the temporary key generated from the first key to the second wireless terminal. Component 730 includes a component 732 configured to encrypt the first message using a temporary key generated from the first key, said temporary key being an encryption key used to encrypt communications between the first access point and the second wireless terminal.

Assembly of components 700 further includes a component 752 configured to operate the first access point to communicate the first message toward the second wireless terminal. Component 752 includes a component 736 configured to forward the first message to a second access point when the second wireless terminal is attached to the second access point and the first access point has mad the access control decision, e.g., an access control decision allowing the second WT access to the first message.

Assembly of components 700 further includes a component 754 configured to operate the second access point to communicate the first message to the second wireless terminal. Component 754 includes a component 738 configured to operate the second access point to secure the first message using a second key used to secure communications over an air link between the second access point and the second wireless terminal. Component 738 includes a component 740 configured to encrypt the first message using a second temporary key generated from the second key, said second key being a preshared key. Component 754 further includes a component 742 configured to transmit the encrypted first message, which was encrypted using the second temporary key generated for the second key, to the second wireless terminal.

In various embodiments, the access point including assembly of components 700 operates as a first access point, e.g., using one or more or all of components: 704, 706, 708, 709, 711, 710, 712, 714, 718, 720, 744, 750, 730, 732, 734, and 752, and 736. In various embodiments, the access point including assembly of components 700 operates as a second access point, e.g., using one or more or all of components: 704, 713, 710, 712, 714, 718, 720, 746, 748, 754, 738, 740, and 742.

While the security related methods and apparatus have been explained generally in the context of unicast communications from one device, e.g., a first WT to a second device, e.g., a second WT, they can be applied to multicast communications as well. In the case of a multicast embodiment, intermediate nodes can be, and sometimes are made aware of the security key used to initially secure a multicast message which was transmitted to a first access point. The decision of whether the intermediate node transmits the multicast message to an individual member of the multicast group, e.g., as a unicast communication, to which the multicast message is addressed in some embodiments depends on the multicast group member having access to the security key initially used to secure the multicast communication. Thus, as in the case of unicast transmissions, multicast transmission can secured based on whether or not a destination device in a group to which the message is addressed is associated with, e.g., has access to, the shared key originally used to secure the multicast message.

Figure 8:
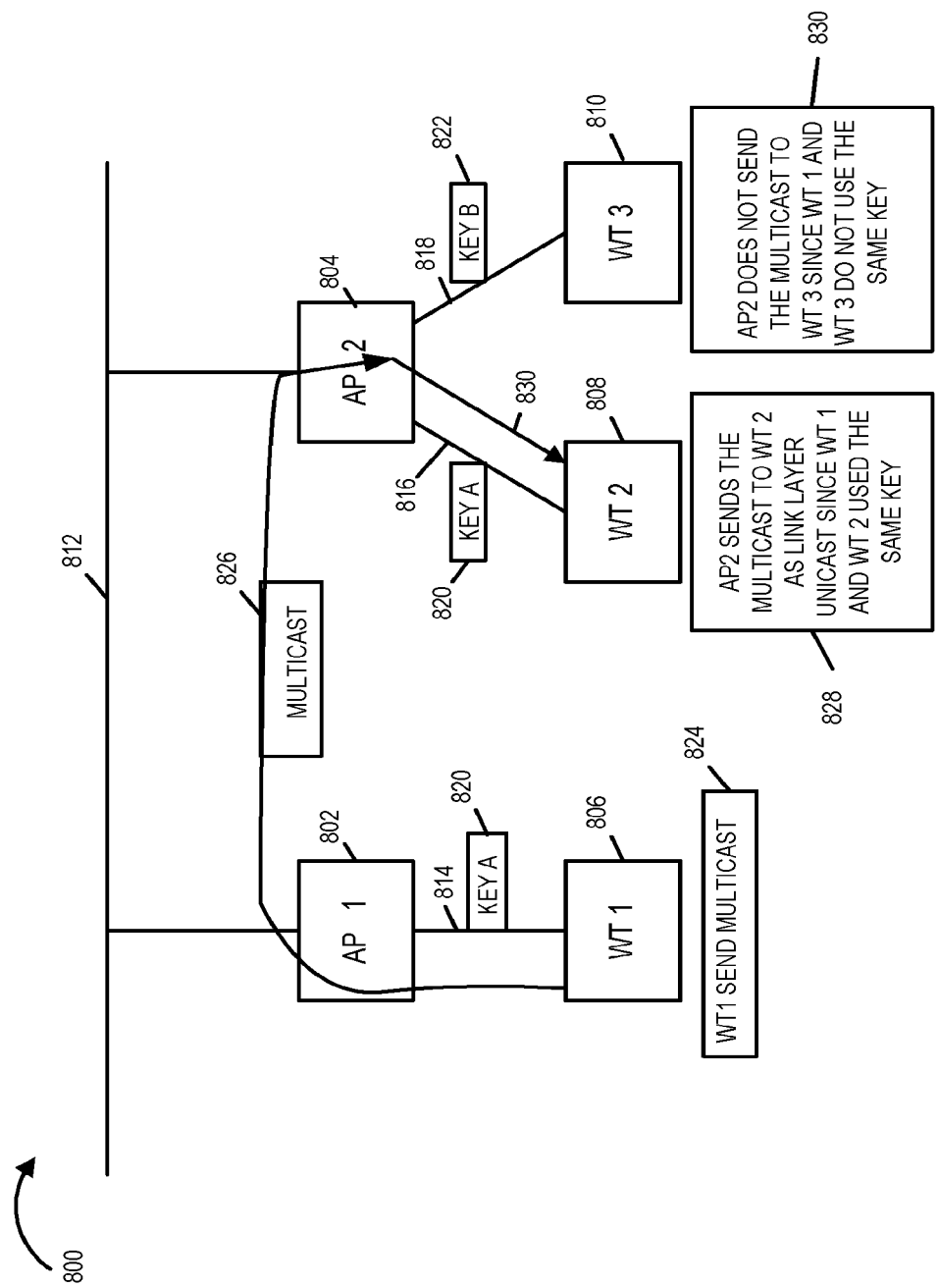
FIG. 8 illustrates a exemplary multicast embodiment in which the security methods are used to control access to the content of one or more multicast messages.

FIG. 8 shows a multicast embodiment including a first access point 802, a second access pint 804 coupled together by network 812. In the FIG. 8 example the first wireless terminal WT 1 806 sends a multicast message in step 824 which is secured by Key A 820. Line 814 represents the multicast message secured by Key A 820 that is communicated to the first AP. The multicast message is decrypted by AP 1 802 and then communicated as multicast message 826, e.g., via network connection 812, to AP2 804 along with information indicating the key, Key A 820 that was used to secure the original communicated message. In response to receiving the multicast message 826 and associated key information identifying Key A 820, AP 2 checks to determine if any WTs attached to AP2 are members of the multicast group to which the multicast message 826 was addressed. If members of the multicast group to which the multicast message 826 is addressed are attached to the second AP 2 804 which received the multicast message the second access point AP 2 proceeds to perform an access control operation on a per device basis, e.g., with the AP 2 804 checking whether or not the individual device which is a member of the multicast group is associated with the key that was used to originally secure the message when it was transmitted to the first AP 1 802. If the second AP determines that an individual device in the addressed multicast group is authorized to obtain access to the multicast message 826 because the individual device is associated with, e.g., has access to, key A 820 the second AP 2 804 will transmit the message as a unicast message to the destination device. If the individual group member is not associated with the key, e.g., Key A, that was used to secure the multicast message 826 the device will be blocked from receiving the message despite being a member of the multicast group.

In the FIG. 8 example, both WT 2 and WT 3 are members of a multicast group corresponding to a multicast address to which multicast message 826 is addressed, WT 2 808 is associated with key A 820 while WT 3 810 is not associated with Key A and is instead associated with Key B 822. In this example AP 2, e.g., using its security component and information received form AP 1 802 indicating that Key A 820 was used to secure multicast message 826 determines that WT 2 808 should receive the message 826 since it is associated with Key A 820 but WT 3 810 should be blocked from receiving the message. In step 828 AP2 sends the multicast message 826, or at least the payload of the message, to WT 2 808 as a link layer unicast message since WT 1 and WT 2 are both associated with Key 1 and thus WT 2 is to be allowed access to message 826. However, in step 830 AP 2 blocks WT 3 810 from receiving the multicast message and does not send the message 826 to WT 3 822 since WT 1 and WT 3 do not use the same key, e.g., WT 3 is not associated with PSK Key A 820. As with the other embodiments the actual communications of messages maybe and sometimes are secured using a short term encryption key generated from the PSK used to secure the transmitted message. Thus, as should be appreciated by communication information about the key (PSK) initially used to secure a multicast message along with the message to another device, e.g., AP 2, the receiving device can provide sufficient information to allow the second AP to implement an access control decision locally based on which PSK was originally used to secure a communicated message.

While the multicast is explained in an example with a single destination AP, it should be appreciated that the multicast message 826 can be communicated to a large number of devices along with the PSK information with the receiving network nodes and/or access points implementing access control decisions based on the received key information and/or knowledge of which devices are downstream of the node acting as an access control device and what PSKs the individual downstream devices are associated with.

Set forth below are various exemplary numbered embodiments. Each set of numbered exemplary embodiments is numbered by itself with embodiments in a set referring to previous numbered embodiments in the same set. List of Set of Exemplary Numbered Method Embodiments:

Method Embodiment 1 A communications method, the method comprising: receiving (509 or 606), at a first wireless access point (106), from a first wireless terminal (116) a first message in encrypted form, said first message being directed to a second wireless terminal (118), the first message being secured using a first key; decrypting (513 or 608) at the first wireless access point (106) the first message received in encrypted form to recover the first message; and making an access control decision ((529 or 556) or 610) used to control access to the first message based on said first key, said step of making an access control decision including determining (530 or 557) or 612) if the first key used to secure the first message is associated with the second wireless terminal (118).

Method Embodiment 2 The method of method embodiment 1, wherein determining (612) if the first key used to secure the first message is associated with the second wireless terminal (118) includes determining (614) from stored information (107 or 114) if the second wireless terminal (118) has access to the first key.

Method Embodiment 3 The communications method of method embodiment 1 A, wherein the first key is a first preshared key (PSK). Method Embodiment 4 The method of method embodiment 1, further comprising: communicating ((532 or 560) or 624) the first message toward the second wireless terminal (118) when it is determined that the first key used to secure the first message is associated with the second wireless terminal (118).

Method Embodiment 5 The method of method embodiment 4, further comprising:
  dropping ((536 or 564) or (644 or 646)) the first message without delivering the first message to the second wireless terminal (118) in response to determining that the first key is not associated with the second wireless terminal (118).

Method Embodiment 6 The method of method embodiment 1, wherein said second wireless terminal (118) is coupled to said first access point (106) and wherein said step of making an access control decision (529 or 610) is performed at the first access point (106).

Method Embodiment 7 The method of method embodiment 6, wherein communicating (532 or 624) the message to the second wireless terminal (118) includes: securing (546 or 630) the first message, at the first access point (106), using the first key prior to transmitting the first message to the second wireless terminal (H8).

Method Embodiment 8 The method of method embodiment 7, wherein securing (546 or 630) the first message using the first key includes encrypting (632) the first message using a temporary key generated from said first key, said temporary key being an encryption key used to encrypt communications between said first access point (106) and said second wireless terminal (118).

Method Embodiment 9 The method of method embodiment 3, further comprising: storing (406 or 604) in a storage device (212 or 115) key association information (107 or 114) listing one or more keys associated with the second wireless terminal (118).

Method Embodiment 10 The method of method embodiment 9, wherein said storage device (115) is included in a management node (112) which stored wireless terminal (WT) key association records and makes the information in the key association records available to one or more access points.

Method Embodiment 11 The method of method embodiment 4, wherein communicating ((532 and 560) or 624) the first message to the second wireless terminal (118) includes forwarding (534 or 636) the first message to a second access point (108 or 110) when the second wireless terminal (118) is attached to the second access point (108 or 110); and operating (561 or 638) the second access point (108) to secure the first message using a second key used to secure communications over an air link between the second access point (108 or 110) and the second wireless terminal (118).

Method Embodiment 12 The method of method embodiment 11, wherein operating (561 or 638) the second access point to secure the first message using a second key includes: encrypting (561 or 640) the first message using a second temporary key generated from said second key, said second key being a preshared key.

Method Embodiment 13 The method of method embodiment 11, wherein said first access point (106) is a WiFi access point; and wherein said second access point (110) is an LTE access point, said second access point (110) using a different wireless communications protocol than said first access point (106).

Method Embodiment 14 The method of method embodiment 13, wherein the first access point (106) is a WiFi access point and the first key is a first PSK; and wherein the second access point (110) is an LTE base station.

Method Embodiment 15 The method of method embodiment 1, wherein said second wireless terminal (110) is coupled to said second access point (108 or 110) and wherein said step of making (556 or 610) an access control decision is performed at the second access point (108 or 110).

Method Embodiment 16 The method of method embodiment 1, wherein said step of making (556 or 610) an access control decision includes deciding (563 or 620) to deny the second wireless terminal access to the first message in response to determining the second wireless terminal (118) is not associated with the first key.

Method Embodiment 17 The method of method embodiment 16, further comprising:
  operating (566 or 620) the second access point to perform at least one of: i) notifying the first access point that the first key is not associated with the second wireless terminal (118) or ii) instructing the first access point to stop forwarding content secured with the first key and directed to the second wireless terminal to the second access point (108 or 110) for delivery to the second wireless terminal (118).

List of Set of Exemplary Numbered System Embodiments

System Embodiment 1 A communications system (100), comprising: a first wireless access point (106) including: a receiver (252) configured to receive from a first wireless terminal (116) a first message in encrypted form, said first message being directed to a second wireless terminal (118), the first message being secured using a first key; and a decrypter (270) configured to decrypt at the first wireless access point (106) the first message received in encrypted form to recover the first message; and an access control device (272) used to control access to the first message based on said first key, said access control device (272) including a determination component (274) configure to determine if the first key used to secure the first message is associated with the second wireless terminal (118).

System Embodiment 2 The system (100) of system embodiment 1, wherein said access control device (272) is an access control component included in said first access point (106).

System Embodiment 3 The system (100) of system embodiment 1, wherein said access control device (272) is an access control component external to said first access point (106).

System Embodiment 4 The system (100) of system embodiment 1 wherein said determination component (274) is configured to determine if the first key used to secure the first message is associated with the second wireless terminal (118), and wherein said determination component (274) is configured to determine from stored information (107 or 114) if the second wireless terminal (118) has access to the first key.

System Embodiment 5 The system (100) of system embodiment 2, wherein the first key is a first preshared key (PSK).

System Embodiment 6 The system (100) of system embodiment 1, further comprising: a transmitter (254) configured to communicate the first message to the second wireless terminal (118) when it is determined that the first key used to secure the first message is associated with the second wireless terminal (H8).

System Embodiment 7 The system (100) of system embodiment 6, wherein the access control device (272) is configured to drop the first message without delivering the first message to the second wireless terminal (118) in response to determining that the first key is not associated with the second wireless terminal (118).

System Embodiment 8 The system (100) of system embodiment 1, further comprising: an encryption device 276 configured to secure the first message, at the first access point (106), using the first key prior to the first message being transmitted to the second wireless terminal.

System Embodiment 9 The system (100) of system embodiment 8, wherein the encryption device (276) includes a temporary key generator (278) for generating from said first key, a temporary key used by the encryption device (270) as an encryption key used to encrypt communications between said first access point (106) and said second wireless terminal (118) as part of securing the first message.

System Embodiment 10 The system (100) of system embodiment 5, further comprising: a storage device (212 or 115) storing key association information (107 or 114) listing one or more keys associated with the second wireless terminal (118).

System Embodiment 11 The system (100) of system embodiment 10, wherein said storage device (115) is included in a management node (112) which stored WT key association records and makes the information in the key association records available to one or more access points (106, 108, 110). Computer readable medium Embodiment:

Computer readable medium Embodiment 1 A non-transitory computer readable medium including machine executable instructions which, when executed by a processor (206) of a wireless access point (200) control the wireless access point (200) to perform the steps of: receiving (509 or 606) from a first wireless terminal (116) a first message in encrypted form, said first message being directed to a second wireless terminal (118), the first message being secured using a first key; decrypting (513 or 608) at the first wireless access point the first message received in encrypted form to recover the first message; and making ((529 or 556) or 610) an access control decision used to control access to the first message based on said first key, said step of making an access control decision including determining ((530 or 557)

or 612) if the first key used to secure the first message is associated with the second wireless terminal (118).

Numbered Apparatus Embodiments

Apparatus Embodiment 1 A wireless access point (200) comprising: memory (212) including preshared key association information (222) including information associating a first key with a first wireless terminal (116); and a processor (206) configured to control the access point (200) to: receive from the first wireless terminal (116) a first message in encrypted form, said first message being directed to a second wireless terminal (118), the first message being secured using the first key; decrypt at the first wireless access point (200) the first message received in encrypted form to recover the first message; and make an access control decision used to control access to the first message based on said first key, said step of making an access control decision including determining if the first key used to secure the first message is associated with the second wireless terminal (118).

The methods and apparatus described herein are well suited for use with a wide variety of protocols including WiFi protocols in the 802 family sometimes identified as 802.1x protocols where x can be any one of a number of different protocol version indicators.

The methods are well suited for 802.1x LAS which used preshared keys and some embodiments and features are directed to APs and other devices which use an 802.1x protocol and which can interact with a device using a PSK or PSKs for security purposes. Thus different combinations of networks and/or security approaches can be used but with access to or association with a PSK still being used to determine whether or not a device is provided access to a particular message or communication. For example a user's personal laptop may use 802.1x while the same user's personal Apple TV uses PSK, and they are part of the same personal WLAN with association with a PSK, e.g. by a user's other device using the PSK, being used to determine if the device is to be given access to a message even if the PSK is not used to secure the final communication to the device. The methods and apparatus of the invention can, and sometimes are used in controlling access control to wired devices or other networks. For example an individual user's personal WLAN maybe allowed to talk to a printer based on a printer being associated with a particular PSK, but someone else's personal WLAN would be denied access if their device was not associated with the PSK even though the PSK may not be used to secure the final communication to the printer.

The techniques of various embodiments may be implemented using software, hardware and/or a combination of software and hardware. Various embodiments are directed to apparatus, e.g., mobile nodes such as mobile wireless terminals, base stations, communications system. Various embodiments are also directed to methods, e.g., method of controlling and/or operating a communications device, e.g., wireless terminals (UEs), base stations, control nodes and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more components to perform the steps corresponding to one or more methods, for example, signal generation, transmitting, processing, and/or receiving steps. Thus, in some embodiments various features are implemented using components. Such components may be implemented using software, hardware or a combination of software and hardware. In some embodiments each component is implemented as an individual circuit with the device or system including a separate circuit for implementing the function corresponding to each described component. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the steps of one or more methods of the invention.

In some embodiments, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a communications device, e.g., user equipment, with a processor which includes a component corresponding to each of the steps of the various described methods performed by the device in which the processor is included. In some but not all embodiments a communications device includes a component corresponding to each of the steps of the various described methods performed by the device in which the processor is included. The components may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with user equipment devices, e.g., mobile nodes, using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method comprising:
    determining, by a wireless access point and based on a message received from a first wireless terminal connected to the wireless access point, that the message is addressed to a second wireless terminal;
    determining, by the wireless access point, a key used to secure communications between the wireless access point and the first wireless terminal;
    determining, by the wireless access point, whether the second wireless terminal is associated with the key used to secure communications between the wireless access point and the first wireless terminal based on whether the second wireless terminal is connected to the wireless access point; and
    based on determining that the second wireless terminal is associated with the key used to secure communications between the wireless access point and the first wireless terminal, forwarding, by the wireless access point, the message to the second wireless terminal.

2. The method of claim 1, wherein the key is a preshared key (PSK).

3. The method of claim 1, wherein the message is a first message and the wireless access point is a first wireless access point, the method further comprising:
    determining, by the first wireless access point and based on a second message received from the first wireless terminal, that the second message is addressed to a third wireless terminal;
    determining, by the first wireless access point, that the third wireless terminal is not associated with the key; and
    based on determining that the third wireless terminal is not associated with the key, dropping, by the first wireless access point, the second message without delivering the second message to the third wireless terminal.

4. The method of claim 1, wherein forwarding the message to the second wireless terminal includes:
    securing, by the wireless access point, the message using the key prior to forwarding the message to the second wireless terminal.

5. The method of claim 1, further comprising:
    storing, in a storage device at a network management node, key information identifying which of a plurality of keys are associated with one or more wireless terminals, wherein determining that the second wireless terminal is associated with the key is based on the stored key information.

6. The method of claim 1, further comprising:
    storing, in a storage device at the wireless access point, key records identifying which of a plurality of keys are associated with one or more wireless terminals, wherein determining that the second wireless terminal is associated with the key is based on the stored key records.

7. The method of claim 1, wherein the wireless access point is a first wireless access point and the key is a first key;
    wherein forwarding the message to the second wireless terminal includes forwarding the message to a second wireless access point when the second wireless terminal is attached to the second wireless access point; and
    securing, by the second wireless access point, the message using a second key used to secure communications between the second wireless access point and the second wireless terminal.

8. The method of claim 7,
    wherein the first wireless access point is a WiFi access point; and
    wherein the second wireless access point is an LTE access point, the second wireless access point using a different wireless communications protocol than the first wireless access point.

9. The method of claim 7, further comprising:
    notifying, by the second wireless access point, the first wireless access point that the second wireless terminal is not associated with the first key or instructing, by the second wireless access point, the first wireless access point to stop forwarding content addressed to the second wireless terminal and secured with the first key to the second wireless access point for delivery to the second wireless terminal.

10. The method of claim 1, further comprising:
    decrypting, by the wireless access point, the message using the key.

11. A wireless access point device, comprising:
    a processor configured to:
    determine, based on a message received from a first wireless terminal connected to the wireless access point, the message is addressed to a second wireless terminal;
    determine a key used to secure communications between the wireless access point and the first wireless terminal;
    determine whether the second wireless terminal is associated with the key used to secure communications between the wireless access point and the first wireless terminal based on whether the second wireless terminal is connected to the wireless access point, and based on determining that the second wireless terminal is associated with the key used to secure communications between the wireless access point and the first wireless terminal, forward the message to the second wireless terminal.

12. The wireless access point device of claim 11, wherein the message is a first message and the wireless access point is a first wireless access point, and wherein the processor is further configured to:
    determine, based on a second message received from the first wireless terminal, that the second message is addressed to a third wireless terminal;
    determine, whether the third wireless terminal is associated with the key; and
    based on determining that the third wireless terminal is not associated with the key, drop the second message without delivering the second message to the third wireless terminal.

13. The wireless access point device of claim 11, wherein the key is a preshared key (PSK).

14. The wireless access point device of claim 11, wherein the processor is further configured to:
    secure the message using the key prior to transmitting the message to the second wireless terminal.

15. The wireless access point device of claim 11, wherein the processor further configured to:
    store key information identifying which of a plurality of keys are associated with one or more wireless terminals, and wherein the processor determines whether the second wireless terminal is associated with the key based on the stored key information.

16. The wireless access point device of claim 11, wherein the wireless access point is a first wireless access point, wherein the processor further configured to:
    forward the message to a second wireless access point when the second wireless terminal is attached to the second wireless access point.

17. The wireless access point device of claim 16, wherein the first wireless access point is a WiFi access point, and wherein the second wireless access point is an LTE access point, the second wireless access point using a different wireless communications protocol than the first wireless access point.

18. The wireless access point device of claim 16, the processor further configured to:
    receive a notification from the second wireless access point, the notification including an indication that the second wireless terminal is not associated with the key or an instruction to stop forwarding content addressed to the second wireless terminal and secured with the key to the second wireless access point for delivery to the second wireless terminal.

19. The wireless access point device of claim 11, wherein the processor is further configured to decrypt the message using the key.

20. A system comprising:
    a first wireless access point connected to a first wireless terminal; and
    a second wireless access point connected to a second wireless terminal;
    the first wireless access point including a processor configured to:
        determine, based on a message received from the first wireless terminal, that the message is addressed to the second wireless terminal;
        determine a key used to secure communications between the first wireless access point and the first wireless terminal;
        based on a determination that the first wireless access point does not have key association information available for the second wireless terminal, forward the message to the second wireless access point;
    the second wireless access point including a processor configured to:
        determine whether the second wireless terminal is associated with the key used to secure communications between the first wireless access point and the first wireless terminal based on whether the second wireless terminal is connected to the second wireless access point; and
        based on determining that the second wireless terminal is associated with the key used to secure communications between the first wireless access point and the first wireless terminal, forward the message to the second wireless terminal.

\* \* \* \* \*